(12) United States Patent
Kubota et al.

(10) Patent No.: US 7,375,349 B2
(45) Date of Patent: May 20, 2008

(54) RADIATION-IMAGE CONVERSION PANEL AND PROCESS OF PRODUCING THE SAME

(75) Inventors: Hajime Kubota, Kanagawa-ken (JP); Atsunori Takasu, Kanagawa-ken (JP); Takeo Kido, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 122 days.

(21) Appl. No.: 10/992,481

(22) Filed: Nov. 19, 2004

(65) Prior Publication Data

US 2005/0139783 A1 Jun. 30, 2005

(30) Foreign Application Priority Data

| Nov. 19, 2003 | (JP) | ............................. 2003-389637 |
| Nov. 20, 2003 | (JP) | ............................. 2003-390578 |
| Nov. 4, 2004 | (JP) | ............................. 2004-320547 |

(51) Int. Cl.
*G01J 1/58* (2006.01)

(52) U.S. Cl. ................................ 250/483.1

(58) Field of Classification Search ............. 250/484.4, 250/483.1
See application file for complete search history.

(56) References Cited

U.S. PATENT DOCUMENTS

| 5,589,252 | A | 12/1996 | Matsuo et al. |
| 5,645,923 | A | 7/1997 | Matsuo et al. |
| 2001/0022349 | A1 | 9/2001 | Takahashi |
| 2002/0066868 | A1 * | 6/2002 | Shoji et al. .............. 250/484.4 |
| 2002/0070351 | A1 * | 6/2002 | Yanagita et al. ......... 250/484.4 |
| 2003/0146395 | A1 | 8/2003 | Fukui |
| 2004/0108464 | A1 * | 6/2004 | Fukui et al. ............. 250/484.4 |
| 2004/0164251 | A1 * | 8/2004 | Bergh et al. ............. 250/484.4 |

FOREIGN PATENT DOCUMENTS

| JP | 06-192454 A | 7/1994 |
| JP | 7-164591 A | 6/1995 |
| JP | 8-201598 A | 8/1996 |
| JP | 2002-98799 A | 4/2002 |

\* cited by examiner

*Primary Examiner*—David Porta
*Assistant Examiner*—Mindy Vu
(74) *Attorney, Agent, or Firm*—Sughrue Mion, PLLC

(57) ABSTRACT

In a radiation-image conversion panel, a fluorescent layer containing a phosphor and a protective layer are formed on a support in this order. The protective layer has a water-vapor transmission rate of 1 $g/m^2/24$ h or lower at 40° C. and a reflectance of 3% or lower at a wavelength of light emitted from the phosphor. In addition, the protective layer may be obtained by attaching a removable film to a thin transparent film so as to produce a laminated film, forming a vapor-barrier layer on an exposed surface of the thin transparent film by vacuum deposition so as to produce a moisture-resistant film, placing the moisture-resistant film on the fluorescent layer, and removing the removable film from the moisture-resistant film.

21 Claims, 6 Drawing Sheets

RADIATION-IMAGE CONVERSION PANEL AND PROCESS OF PRODUCING THE SAME

BACKGROUND OF THE INVENTION

1. Field of the Invention

The present invention relates to a radiation-image conversion panel for use in the radiation-image conversion techniques utilizing stimulable phosphors, and a process for producing such a radiation-image conversion panel.

2. Description of the Related Art

The computed radiography (CR) is known as a technique for recording and reproducing a radiographic image. In the computed radiography (CR), a system constituted by a radiographic-image record device, a radiographic-image reading device, and the like is used, and the stimulable (photostimulable) phosphor is used in the system. When the stimulable phosphor is irradiated with radiation such as X-rays, a portion of the energy of the radiation is accumulated in the stimulable phosphor. Thereafter, when the stimulable phosphor is irradiated with excitation light such as visible light, the stimulable phosphor emits stimulated luminescence the amount of which corresponds to the accumulated energy of the radiation. The radiographic-image record device temporarily records a radiographic image of an object such as a human body as a latent image in a stimulable-phosphor layer, and the radiographic-image record device irradiates the stimulable-phosphor layer with excitation light such as laser light so as to emit stimulated luminescence, and photoelectrically detects the stimulated luminescence so as to acquire an image signal representing the radiographic image of the object.

The radiation-image conversion panel is known as a recording medium used in the above system. The radiation-image conversion panel is formed, for example, by laminating a rigid substrate, a stimulable-phosphor layer, and a protective layer. It is possible to remove radiation energy remaining in the stimulable-phosphor layer by irradiating the stimulable-phosphor layer with erasing light after the radiographic image is read from the stimulable-phosphor layer. Therefore, it is possible to repeatedly record and read radiographic images in each radiation-image conversion panel. In order to suppress chemical deterioration of and physical impact on each stimulable-phosphor layer (which are caused by the repeated use of each stimulable-phosphor layer), normally a protective layer is formed over the stimulable-phosphor layer (i.e., on a surface of the stimulable-phosphor layer on the side opposite to the substrate).

Generally, the protective layer of the radiation-image conversion panel is made of a resin which is transparent to the excitation light and the emitted light. However, when the thickness of the protective layer is small, unevenness (such as interference fringes) or imperfection is likely to occur in the radiographic image. In order to solve this problem, it has been proposed to make the protective layer have a certain haze value, or arrange a antireflection layer over the protective layer. Japanese Unexamined Patent Publication No. 8(1996)-201598 discloses a radiation-image conversion panel having an antireflection layer made of an organic solvent-soluble material and arranged on a transparent protective layer, where the surface of the antireflection layer is made of a fluorine resin, and the surface reflectances of the antireflection layer at incident angles of 0 to 60 degrees of the light having a wavelength in the ranges of 30 to 500 and 600 to 900 nm do not exceed 10%.

Japanese Unexamined Patent Publication No. 2002-098799 discloses a radiation-image conversion panel having a protective layer which is formed of a material containing aluminum oxide or silicon oxide by evaporation, and has a gaseous barrier property exhibiting the water-vapor transmission rate of 2 $g/m^2/24$ h or lower and the oxygen transmission rate of 2 $cc/m^2/24$ h or lower. Since the protective layer in this radiation-image conversion panel is made by evaporation of an inorganic material having a gaseous barrier property, the protective layer can be formed as a thin film. In addition, since the thin film is less likely to produce image blur caused by light scattering, the quality of the initial image obtained by use of the radiation-image conversion panel is improved.

Further, U.S. Patent Laid-Open No. 20030146395 discloses a radiation-image conversion panel having a protective layer and transparent inorganic layers and organic layers, where the transparent inorganic layers and organic layers are alternately formed, the number of the transparent inorganic and the organic layers is four or more, and the protective layer has a thickness of 50 micrometers or smaller, an air transmission rate of 0.5 $cc/m^2/24$ h or lower, and a water-vapor transmission rate of 0.5 $g/m^2/24$ h or lower. The transparent inorganic layers are made of metal oxides, metal nitrides, or metal oxynitrides, and formed by vacuum deposition. The organic layers are formed by application or vacuum deposition. Therefore, the moisture resistance of the radiation-image conversion panel can be enhanced. In addition, since it is unnecessary to bond the layers to each other with an adhesive, it is possible to prevent occurrence of image blur caused by the bonding, and form the transparent protective layer so that the total thickness of the transparent protective layer is reduced. Thus, high quality images can be obtained.

As mentioned above, the protective layer disclosed in Japanese Unexamined Patent Publication No. 2002-098799 is formed by evaporation, and the transparent inorganic layers and/or the organic layers in the protective layer disclosed in U.S. Patent Laid-Open No. 20030146395 are formed by vacuum deposition. However, when an inorganic layer is formed on a support (e.g., a PET film) for the protective layer or an organic layer by vacuum deposition, distortion or wrinkles are likely to occur in the protective layer, and therefore the quality of the images obtained by use of the radiation-image conversion panel deteriorates.

In order to suppress the occurrence of distortion and wrinkles during formation of the protective layer, it is necessary to increase the thickness of the support or the organic layers on which the inorganic layers are to be formed. However, when the thickness of the support or the organic layers is increased, optical scattering causes image blur, and therefore it becomes difficult to obtain satisfactory images. In addition, if, as an alternative to the use of the support or the organic layers, an inorganic layer is directly formed on a stimulable-phosphor layer by vacuum deposition, it is difficult to form a uniform inorganic layer by evaporation in the case where the stimulable-phosphor layer has a gap structure constituted by columnar crystals as in the radiation-image conversion panel disclosed in Japanese Unexamined Patent Publication No. 2002-098799.

SUMMARY OF THE INVENTION

An object of the present invention is to provide a radiation-image conversion panel which is so moisture resistant as to have a practical lifetime, is highly sensitive, and enables formation of satisfactory images.

Another object of the present invention is to provide a process for producing the above radiation-image conversion panel which is so moisture resistant as to have a practical lifetime, is highly sensitive, and enables formation of satisfactory images.

(1) According to the first aspect of the present invention, there is provided a radiation-image conversion panel comprising: a support; a fluorescent layer being formed on the support and containing a stimulable phosphor; and a protective layer being formed on the fluorescent layer and having a water-vapor transmission rate of 1 g/m²/24 h or lower at 40° C. and a reflectance of 3% or lower at a wavelength of light emitted from the stimulable phosphor.

In the radiation-image conversion panel according to the first aspect of the present invention, the protective layer per se has the antireflection function and the moisture-resistance function. Therefore, it is possible to obtain a high quality radiographic image which is superior in quality (e.g., sharpness) and free from unevenness and defects without separately providing an antireflection layer and a vapor-barrier layer, and enhance the moisture resistance and durability of the radiation-image conversion panel. In particular, when the fluorescent layer is made of only a hygroscopic fluorescent material such as alkali metal halide-based stimulable phosphor, the effect of preventing deterioration of the fluorescent material caused by moisture absorption becomes remarkable. Further, the antireflection function and the moisture-resistance function can be maintained without specially increasing the thickness of the protective layer (i.e., without image blur caused by increase in the thickness of the protective layer).

Preferably, the radiation-image conversion panel according to the first aspect of the present invention may also have one or any possible combination of the following additional features (i) to (xii).

(i) The protective layer covers an upper surface and side surfaces of the fluorescent layer.

(ii) The protective layer comprises a transparent substrate and a single layer being formed on the transparent substrate and having a lower refractive index than the transparent substrate.

(iii) The protective layer comprises a transparent substrate and at least one first sublayer and at least one second sublayer which are alternately formed on the transparent substrate, each of the at least one first sublayer have a high refractive index, each of the at least one second sublayer have a low refractive index, and at least one of the transparent substrate, the at least one first sublayer, and the at least one second sublayer has a low water-vapor transmission rate.

(iv) In the radiation-image conversion panel having the feature (iii), each of the at least one first sublayer is made of an inorganic material having the high refractive index, and each of the at least one second sublayer is made of an inorganic material having the low refractive index.

(v) In the radiation-image conversion panel having the feature (iv), the inorganic material having the high refractive index is one of titanium dioxide and a composite indium-tin oxide.

(vi) In the radiation-image conversion panel having the feature (iv), the inorganic material having the low refractive index is at least one of silicon oxide and aluminum oxide.

(vii) In the radiation-image conversion panel having the feature (vi), one or more of the at least one second sublayer has a density of 1.9 to 4.2 g/cm³.

(viii) In the radiation-image conversion panel having the feature (vii), one or more of the at least one second sublayer is formed by sputtering at 0.01 to 1 Pa of vacuum.

(ix) In the radiation-image conversion panel having the feature (vii), one or more of the at least one second sublayer is formed by plasma chemical vapor deposition.

(x) The protective layer has a thickness of 5 to 10 micrometers.

(xi) The fluorescent layer is formed by vapor deposition.

(xii) The stimulable phosphor is an alkali metal halide-based stimulable phosphor which has a composition expressed by the following basic formula (I).

$$M^I X \cdot aM^{II} X'_2 \cdot bM^{III} X''_3 : zA \tag{I}$$

In the above basic formula (I): $M^I$ is at least one alkali metal element selected from a group consisting of Li, Na, K, Rb and Cs; $M^{II}$ is at least one alkaline-earth metal element or divalent metal element selected from a group consisting of Be, Mg, Ca, Sr, Ba, Ni, Cu, Zn and Cd; $M^{III}$ is at least one rare-earth element or trivalent metal element selected from a group consisting of Sc, Y, La, Ce, Pr, Nd, Pm, Sm, Eu, Gd, Tb, Dy, Ho, Er, Tm, Yb, Lu, Al, Ga and In; each of X, X' and X" is at least one halogen element selected from a group consisting of F, Cl, Br and I; A is at least one rare-earth element or metal element selected from a group consisting of Y, Ce, Pr, Nd, Sm, Eu, Gd, Tb, Dy, Ho, Er, Tm, Yb, Lu, Cu, Ag, Tl and Bi; and a, b and z are numerical values respectively satisfying $0 \leq a < 0.5$, $0 \leq b < 0.5$ and $0 < z < 1.0$.

(xiii) In the radiation-image conversion panel having the feature (xii): $M^I$ is Cs, X is Br, A is Eu, and z satisfies the condition $1 \times 10^{-4} \leq z \leq 0.1$.

(2) According to the second aspect of the present invention, there is provided a radiation-image conversion panel which comprises: a stimulable-phosphor layer; and a protective layer formed on the stimulable-phosphor layer. The protective layer is obtained by attaching a removable film to a thin transparent film so as to produce a laminated film, forming a vapor-barrier layer on an exposed surface of the thin transparent film which constitutes the laminated film by vacuum deposition so as to produce a moisture-resistant film, placing the moisture-resistant film on the stimulable-phosphor layer, and removing the removable film from the moisture-resistant film.

In the radiation-image conversion panel according to the second aspect of the present invention, no wrinkle is produced in the thin transparent film. In addition, the use of the removable film enables uniform formation of the vapor-barrier layer even when the thickness of the thin transparent film is very small. Therefore, the radiation-image conversion panel according to the second aspect of the present invention is superior in sharpness, image quality, and moisture resistance.

Preferably, the radiation-image conversion panel according to the second aspect of the present invention may also have one or any possible combination of the following additional features (xiv) and (xv).

(xiv) The thin transparent film has a thickness of 10 micrometers or smaller, and more preferably 2 to 7 micrometers. In this case, it is possible to further enhance the sharpness.

(xv) After the vapor-barrier layer is formed, the thin transparent film has a water-vapor transmission rate of 1 g/ (m²/day) or lower, and more preferably 0.2 g/

(m²/day) or lower. In this case, it is possible to further enhance the moisture resistance.

(3) According to the third aspect of the present invention, there is provided a process for producing a radiation-image conversion panel which includes a stimulable-phosphor layer and a protective layer formed on the stimulable-phosphor layer through an adhesive layer. The process comprises the steps of: (a) attaching a removable film to a thin transparent film so as to produce a laminated film, where the removable film has a thickness of 10 to 500 micrometers; (b) forming a vapor-barrier layer on an exposed surface of the thin transparent film constituting the laminated film by vacuum deposition so as to produce a moisture-resistant film; and (c) removing the removable film from the moisture-resistant film so as to obtain the protective layer.

(4) According to the fourth aspect of the present invention, there is provided a process for producing a radiation-image conversion panel in which a stimulable-phosphor layer is arranged between a substrate and a protective layer and is hermetically sealed. The process comprises the steps of: (a) attaching a removable film to a thin transparent film so as to produce a laminated film, where the removable film has a thickness of 10 to 500 micrometers; (b) forming a vapor-barrier layer on an exposed surface of the thin transparent film constituting the laminated film by vacuum deposition so as to produce a moisture-resistant film; and (c) removing the removable film from the moisture-resistant film so as to obtain the protective layer.

DESCRIPTION OF PREFERRED EMBODIMENTS

First Embodiment

First, the radiation-image conversion panel according to the first embodiment of the present invention corresponding to the aforementioned first aspect of the present invention is explained in detail below with reference to drawings.

Figure 1:
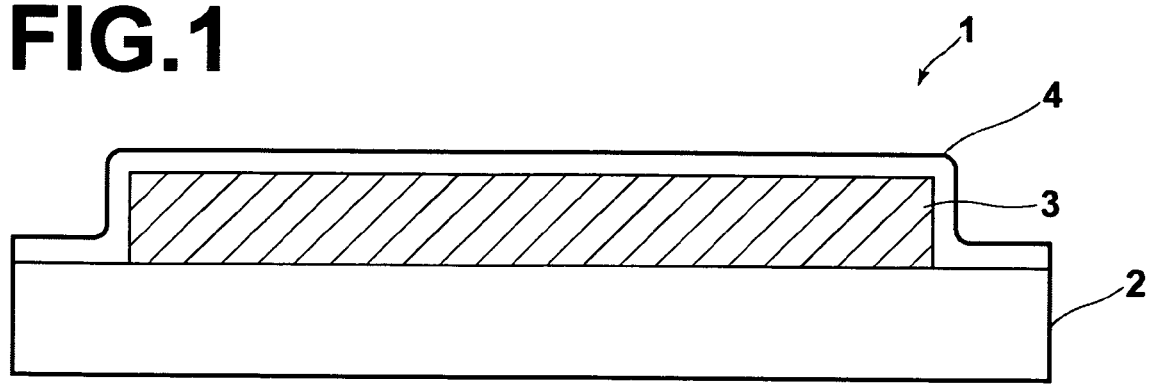
FIG. 1 is a schematic cross-sectional view of an outline of a construction of a radiation-image conversion panel according to a first embodiment of the present invention corresponding to the aforementioned first aspect of the present invention.

FIG. 1 is a schematic cross-sectional view of a construction of a radiation-image conversion panel according to the first embodiment of the present invention. In FIG. 1, the radiation-image conversion panel 1 comprises a support 2, a stimulable-phosphor layer 3, and a protective layer 4, which is arranged to cover the upper and side surfaces of the stimulable-phosphor layer 3 and the upper surfaces of the support 2 around the stimulable-phosphor layer 3.

Figure 2:
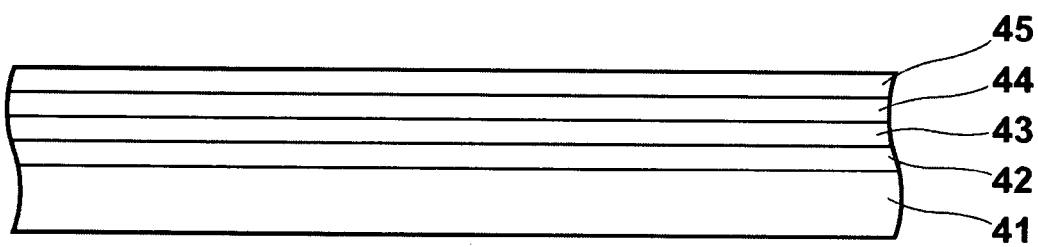
FIG. 2 is a schematic cross-sectional view of an example of a protective layer in the radiation-image conversion panel of FIG. 1.

FIG. 2 is a schematic cross-sectional view of an example of the protective layer 4 in the radiation-image conversion panel of FIG. 1. In FIG. 2, the protective layer 4 has a structure in which a low-refractive-index sublayer 42, a high-refractive-index sublayer 43, a low-refractive-index sublayer 44, and a high-refractive-index sublayer 45 are formed on a transparent substrate 41 in this order. Since the low-refractive-index sublayers and the high-refractive-index sublayers are alternately formed, it is possible to realize the antireflection function. In addition, the water-vapor transmission rate of at least one of the sublayers 42 to 45 is low. Therefore, the protective layer 4 has the moisture-resistance function.

Specifically, the reflectance of the protective layer 4 at the wavelength of light emitted from the stimulable phosphor is 3% or lower, and the water-vapor transmission rate of the protective layer 4 is 1 g/m²/24 h or lower at 40° C., preferably 0.5 g/m²/24 h or lower, and more preferably 0.1 g/m²/24 h or lower.

It is preferable that each of the low-refractive-index sublayers 42 and 44 is made of an inorganic material having a low refractive index. For example, the inorganic material having a low refractive index is $SiO_x$ ($1.5 \leq x \leq 2.0$), $Al_2O_3$, $MgF_2$, or a combination of these materials. It is also preferable that each of the high-refractive-index sublayers 43 and 45 is made of an inorganic material having a high refractive index. For example, the inorganic material having a high refractive index is $TiO_2$, ITO (a composite tin-indium oxide), $CeO_2$, $Sb_2O_5$, $SnO_2$, $In_2O_3$, $Y_2O_3$, $La_2O_3$, $HfO_2$, $ZrO_2$, or a combination of these materials.

For example, the at least one of the sublayers 42 to 45 having the low water-vapor transmission rate can be formed by using $SiO_x$ (having a low refractive index) with a high density of 1.9 to 2.2 g/cm³, or by using $Al_2O_3$ (having a low refractive index) with a high density of 3.8 to 4.2 g/cm³, or by using a mixture of $SiO_x$ and $Al_2O_3$ (having a low refractive index) with a high density of 1.9 to 4.2 g/cm³. However, the at least one of the sublayers 42 to 45 having the low water-vapor transmission rate can be formed in any other manners as far as the water-vapor transmission rate of the entire protective layer 4 is 1 g/m²/24 h or lower at 40° C. (preferably, 0.5 g/m²/24 h or lower).

The transparent substrate 41 is simply required to be transparent to visible light (the excitation light and the light emitted from the stimulable phosphor). For example, the transparent substrate 41 is made of, for example, a polymer material such as polyethylene terephthalate (PET), polyethylene naphthalate, polyolefin, polyethersulfone, polyethylene sulfide, polystyrene, polycarbonate, polymethylmethacrylate, triacetyl cellulose, or triacetate. The most preferable material among the above polymer materials is polyethylene terephthalate (PET). However, in the case where the protective layer is arranged on only a surface of the fluorescent layer, the transparent substrate 41 can be realized by a plastic board or a glass sheet as well as a flexible plastic film made of one of the above polymer materials. Generally, the thickness of the transparent substrate 41 is 1 to 500 micrometers, and preferably 3 to 100 micrometers.

Since, according to the present invention, the protective layer 4 is antireflective at the wavelength of the light emitted from the stimulable phosphor, substantially the emitted light does not spread by reflection by the protective layer 4. Therefore, when information on a radiographic image is read from the radiation-image conversion panel by line scanning, it is possible to effectively prevent spread of the emitted light, and obtain an image which is superior in sharpness. In addition, unevenness (such as interference fringes) or defects do not occur in the radiographic image. Further, since the protective layer 4 is moisture resistant, it is possible to prevent deterioration (in emission characteristics) of the fluorescent material caused by moisture absorption, and enhance the durability of the radiation-image conversion panel, even when the stimulable phosphor is hygroscopic, and in particular when the fluorescent layer is formed of only a hygroscopic stimulable phosphor by vapor deposition or the like and does not contain a binder.

In particular, when the side surfaces (as well as the upper surface) of the stimulable-phosphor layer 3 are covered with the protective layer 4 (i.e., when the stimulable-phosphor layer 3 is sealed with the support 2 and the protective layer 4) as illustrated in FIG. 1, the moisture resistance of the radiation-image conversion panel can be remarkably enhanced.

The structures of the radiation-image conversion panel and the protective layer are not limited to those illustrated in FIGS. 1 and 2. For example, the various auxiliary layers may be arranged in the radiation-image conversion panel as explained later. In addition, the protective layer may be arranged on only the upper surface of the stimulable-phosphor layer 3. Further, the protective layer may be realized by forming on a transparent substrate a single layer having a refractive index lower than that of the transparent substrate.

When the protective layer includes a plurality of low-refractive-index sublayers and a plurality of high-refractive-index sublayers, the number of the sublayers and the thicknesses of the respective sublayers are determined according to the types and combinations of the inorganic materials forming the respective sublayers and the type (emission wavelength) of the stimulable phosphor. The number of the sublayers is at least two, and preferably four to six. The thickness of each sublayer is about ¼ of the emission wavelength, e.g., about 20 to 200 nm.

Next, a process for producing the radiation-image conversion panel according to the first embodiment of the present invention is explained in detail below by taking as an example a case where a stimulable-phosphor layer is formed of a stimulable phosphor by vapor deposition (evaporation).

In this example, the substrate on which the film is formed by evaporation is the support of the radiation-image conversion panel, and can be made of any of the materials which are used in the supports of the conventional radiation-image conversion panels. It is preferable that the substrate is a quartz-glass sheet, a sapphire-glass sheet, a metal sheet made of aluminum, iron, tin, chromium, or the like, or a resin sheet made of aramid or the like. In particular, a glass substrate or an aluminum substrate is most preferable. It is known that a light-reflecting layer made of a light-reflective material such as titanium dioxide and a light-absorbing layer made of a light-absorptive material such as carbon black are provided on the substrates in the conventional radiation-image conversion panels in order to improve the sensitivity of the panel and the quality (sharpness, granularity, and the like) of images obtained by use of the panels. The above light-reflecting layer and the above light-absorbing layer used in the conventional radiation-image conversion panels can also be provided on the substrate in the radiation-image conversion panel according to the present invention, and the structures of the light-reflecting layer and the light-absorbing layer can be arbitrarily determined according to the purpose, use, and the like of a desired radiation-image conversion panel. Further, in order to enhance the crystallinity of the columnar crystals of the film formed on the substrate by evaporation, it is possible to form very small protrusions and recessions on a surface of the substrate on which the film is formed by evaporation (or on a surface of an auxiliary layer formed on the substrate, where the auxiliary layer is, for example, the light-reflecting layer, the light-absorbing layer, or an undercoating layer provided for making a surface of the substrate adhesive).

Preferably, the stimulable phosphor is a stimulable phosphor which exhibits stimulated emission of light having a wavelength of 300 to 500 nm when the stimulable phosphor is irradiated with excitation light having a wavelength of 400 to 900 nm.

In particular, the first to fourth types of stimulable phosphors respectively expressed by the following basic formulas (I), (II), (III), and (IV) can be preferably used as the stimulable phosphor in the radiation-image conversion panel according to the present invention.

(1) The first type of stimulable phosphors are alkali metal halide-based stimulable phosphors which have a composition expressed by the following basic formula (I).

$$M^I X \cdot aM^{II} X'_2 \cdot bM^{III} X''_3 : zA \qquad (I)$$

In the above basic formula (I): $M^I$ is at least one alkali metal element selected from a group consisting of Li, Na, K, Rb and Cs; $M^{II}$ is at least one alkaline-earth metal element or divalent metal element selected from a group consisting of Be, Mg, Ca, Sr, Ba, Ni, Cu, Zn and Cd; $M^{III}$ is at least one rare-earth element or trivalent metal element selected from a group consisting of Sc, Y, La, Ce, Pr, Nd, Pm, Sm, Eu, Gd, Tb, Dy, Ho, Er, Tm, Yb, Lu, Al, Ga and In; A is at least one rare-earth element or metal element selected from a group consisting of Y, Ce, Pr, Nd, Sm, Eu, Gd, Tb, Dy, Ho, Er, Tm, Yb, Lu, Cu, Ag, Tl and Bi; each of X, X' and X" is at least one halogen element selected from a group consisting of F, Cl, Br and I; and a, b and z are numerical values respectively satisfying $0 \leq a < 0.5$, $0 \leq b < 0.5$ and $0 < z < 1.0$. It is further preferable that z satisfies the condition $1 \times 10^{-4} \leq z \leq 0.1$. In addition, it is more preferable that $M^I$ includes Cs, X includes Br, and A is Eu or Bi. It is further preferable that A is Eu. Further, when necessary, the stimulable phosphor expressed by the basic formula (I) may be doped with another metal oxide such as aluminum oxide, silicon dioxide, or zirconium oxide as an additive so that the mole ratio of the additive to $M^I X$ is 0.5 or less.

(2) The second type of stimulable phosphors are rare-earth-activated alkaline-earth metal fluorohalide-based stimulable phosphors which have a composition expressed by the following basic formula (II).

$$M^{II} FX : zLn \qquad (II)$$

In the above basic formula (II): $M^{II}$ is at least one alkaline-earth metal element selected from a group consisting of Ba, Sr, and Ca; Ln is at least one rare-earth element selected from a group consisting of Ce, Pr, Sm, Eu, Tb, Dy, Ho, Nd, Er, Tm, and Yb; X is at least one halogen element selected from a group consisting of Cl, Br, and I, and z satisfies the condition $0 < z \leq 0.2$.

In particular, it is preferable that $M^{II}$ in the basic formula (II) contains Ba with a percentage of 50% or more, and Ln is Eu or Ce. Although the basic formula (II) has the appearance of the mole ratio F:X=1:1, the basic formula (II) merely shows that the stimulable phosphor has the BaFX type crystal structure, and does not indicate the stoichiometric composition of the actually used compound. Generally, in order to enhance the efficiency of the emission of light stimulated by light in the wavelength range from 600 to 700 nm, it is preferable that a great number of $F^+$ ($X^-$) centers (which are vacant lattice points of the $X^-$ ions) are generated in the BaFX crystal. In many cases where a great number of $F^+$ ($X^-$) centers are generated, the number of F atoms is greater than the number of X atoms.

Further, when necessary, the stimulable phosphor expressed by the basic formula (II) may be doped with one or more of the following types of additives.

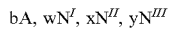

$bA, wN^I, xN^{II}, yN^{III}$

In the above expressions of the additives, A is a metal oxide such as $Al_2O_3$, $SiO_2$, or $ZrO_2$. In order to prevent sintering of the $M^{II}FX$ particles, it is preferable to use a metal oxide of which the primary particles are ultrafine particles having an average diameter of 0.1 micrometers or smaller, and low reactivity to $M^{II}FX$. In addition, $N^I$ is a compound of at least one alkali metal element selected from a group consisting of Li, Na, K, Rb, and Cs, $N^{II}$ is a compound of at least one alkaline-earth metal element selected from a group consisting of Mg and Be, and $N^{III}$ is a compound of at least one trivalent metal element selected from a group consisting of Al, Ga, In, Tl, Sc, Y, La, Gd, and Lu. The above compounds of metals are preferably halides of the metals, although not limited to such halides.

In the above expressions of the additives, each of b, w, x, and y is a value indicating the mole ratio of each additive to $M^{II}FX$. In this example, the values of b, w, x, and y satisfy the conditions $0 \leq b \leq 0.5$, $0 \leq w \leq 2$, $0 \leq x \leq 0.3$, and $0 \leq y \leq 0.3$, respectively. Each of these values does not indicate the relative amount of the corresponding additive material remaining in the final compound when the amount of the corresponding additive material is reduced through a calcining process and a cleaning process after the calcining process. In addition, some of the above compounds may remain in the final composition as those are added, or react to $M^{II}FX$, or are captured by $M^{II}FX$.

Furthermore, when necessary, the stimulable phosphor expressed by the basic formula (II) may also be doped with a compound of Zn or Cd, a metal oxide such as $TiO_2$, BeO, MgO, CaO, SrO, BaO, ZnO, $Y_2O_3$, $La_2O_3$, $In_2O_3$, $GeO_2$, $SnO_2$, $Nb_2O_5$, $Ta_2O_5$, $ThO_2$ and the like, a compound of Zr or Sc, a compound of B, a compound of As or Si, a tetrafluoroborate, a hexafluoro compound such as a monovalent or divalent metal hexafluorosilicate, a monovalent or divalent metal hexafluorotitanate, or a monovalent or divalent metal hexafluorozirconate, or a compound of a transition metal such as V, Cr, Mn, Fe, Co, or Ni. In addition, basically, any material having a composition which can be regarded as a rare-earth-activated alkaline-earth metal fluorohalide-based stimulable phosphor can be used as the stimulable phosphor in the present invention.

(3) The third type of stimulable phosphors are rare-earth-activated alkaline-earth metal sulfide-based stimulable phosphors which have a composition typically expressed by the following basic formula (III).

$$M^{II}S{:}A, Sm \quad (III)$$

In the above basic formula (III), $M^{II}$ is at least one alkaline-earth metal element selected from a group consisting of Mg, Ca, and Sr, and A is at least one element selected from a group consisting of Eu and Ce.

(4) The fourth type of stimulable phosphors are cerium-activated trivalent metal oxyhalide-based stimulable phosphors which have a composition typically expressed by the following basic formula (IV).

$$M^{III}OX{:}Ce \quad (IV)$$

In the above basic formula (IV), $M^{III}$ is at least one rare-earth element or trivalent metal element selected from a group consisting of Pr, Nd, Pm, Sm, Eu, Tb, Dy, Ho, Er, Tm, Yb, and Bi, and X is at least one halogen element selected from a group consisting of Cl, Br and I.

In the case where the multisource evaporation (co-evaporation) is used for forming the evaporated film, at least two evaporation sources are used, where one of the at least two evaporation sources contains at least one basic component of the stimulable phosphor and another of the at least two evaporation sources contains at least one component of at least one activator in the stimulable phosphor. In the case where there is a great difference in the melting point and the vapor pressures among the at least one basic component of the stimulable phosphor and the at least one component of the at least one activator, it is possible to uniformly distribute the at least one activator in the at least one basic component by using the multisource evaporation and respectively controlling the evaporation rates of the at least one basic component and the at least one component of the at least one activator, and therefore the use of the multisource evaporation is preferable. In addition, according to the composition of a desired stimulable phosphor, it is possible to provide an evaporation source for each of the at least one basic component and the at least one component of the at least one activator, or provide each of at least one evaporation source for a mixture of more than one of the at least one basic component and the at least one component of the at least one activator. Generally, the number of the evaporation sources may be three or more. For example, it is possible to provide a further evaporation source containing at least one component of at least one additive.

The evaporation source containing the at least one basic component may be the at least one basic compound which constitutes the basic material, or a mixture of two or more raw materials which can react so as to produce the at least one basic compound. In addition, an evaporation source containing each of the at least one component of the at least one activator is generally a compound containing at least one element constituting the component of the at least one activator, and for example, a halide or an oxide of the element of the activator.

When an activator is Eu, it is preferable that the mole percentage of the $Eu^{2+}$ compound in the Eu compound is as high as possible, since desired stimulated emission (or instantaneous emission) occurs in a phosphor containing $Eu^{2+}$ as an activator. Since the $Eu^{2+}$ compounds and $Eu^{3+}$ compounds are mixedly contained in many commercially available packages of the Eu compounds due to mixing of oxygen. In such cases, it is desirable to remove the oxygen through a melting process in an atmosphere of bromine gas, and obtain $EuBr_2$ as the $Eu^{2+}$ compound.

Preferably, one of the moisture content of at least one evaporation source is 0.5% or less by weight. When the at least one basic component of the stimulable phosphor and the at least one component of the at least one activator in the at least one evaporation source is a hygroscopic material such as EuBr or CsBr, it is particularly important to limit the moisture content to a small value as above from the viewpoint of prevention of bumping. It is preferable to dehydrate each component of the stimulable phosphor by heating the evaporation source at the temperature of 100 to 300° C. and a reduced pressure. Alternatively, it is possible to melt each component of the stimulable phosphor by heating the component for tens of minutes to several hours at the temperature equal to or higher than the melting point of the component in a dry atmosphere such as a nitrogen atmosphere.

Further, according to the present invention, it is preferable that the content of the alkali metal impurity (containing alkali metal elements other than the constituent elements of the stimulable phosphor) in the at least one evaporation source (in particular, one or more evaporation source containing the at least one basic component of the stimulable phosphor) is 10 ppm or less, and the content of the alkaline-earth metal impurity (containing alkaline-earth metal elements other than the constituent elements of the stimulable phosphor) in the at least one evaporation source (in particular, one or more evaporation source containing the at least one basic component of the stimulable phosphor) is 5 ppm or less (by weight). When the stimulable phosphor is an alkali metal halide-based stimulable phosphor which has a composition expressed by the following basic formula (I), it is particularly preferable that the contents of the alkali metal impurity and the alkaline-earth metal impurity are controlled as above.

The contents of the alkali metal impurity and the alkaline-earth metal impurity in the at least one evaporation source can be controlled as above by use of raw materials in which the contents of the alkali metal impurity and the alkaline-earth metal impurity are small.

Specifically, a substrate and a plurality of evaporation sources are placed in a vacuum system, and the vacuum system is evacuated so as to realize a medium vacuum of about 0.1 to 10 Pa, and preferably 0.1 to 4 Pa. It is more preferable that the above medium vacuum is realized by evacuating the vacuum system to a high vacuum of about $1 \times 10^{-5}$ to $1 \times 10^{-2}$ Pa and thereafter introducing inert gas such as Ar, Ne, or $N_2$ gas so as to realize the above medium vacuum. Thus, it is possible to lower the partial pressures of water vapor, oxygen, and the like. For evacuation of the vacuum system, one or more evacuation devices such as rotary pumps, turbo-molecular pumps, cryo-pumps, diffusion pumps, mechanical boosters, and their appropriate combinations can be used. Next, evaporation is performed by resistance heating. The resistance heating is advantageous in that evaporation can be performed in a medium vacuum, and a satisfactory film with columnar crystals can be easily formed by evaporation. Specifically, the evaporation sources are heated by passing electric current through a plurality of resistance heaters. At this time, the basic components of the stimulable phosphor, the components of the activator, and the like are heated, evaporated, and spread, and/or cause reaction so as to produce the stimulable phosphor. Then, the stimulable phosphor is deposited on a surface of the substrate. Generally, the distance between each evaporation source and the substrate is 10 to 1,000 mm, and the distances between the plurality of evaporation sources are also 10 to 1,000 mm, although these distances can vary with the size of the substrate and the like. For the evaporation, the substrate may be heated or cooled. Generally, the temperature of the substrate is 20 to 350° C. The evaporation rate of each evaporation source can be controlled by adjusting the resistance current in each heater and the like. Generally, the evaporation on the substrate, i.e., the rate at which the stimulable phosphor is deposited on the substrate, is 0.1 to 1,000 μm/min, and preferably 1 to 100 μm/min.

In addition, it is possible to form more than one fluorescent layer by performing the heating operation by use of the resistance heaters two or more times. Further, it is possible to perform a heat treatment (an annealing treatment) of the film which is formed by the deposition after the evaporation. Generally, the heat treatment is performed at the temperature of 100 to 300° C. for 0.5 to 3 hours. Preferably, the heat treatment is performed for 0.5 to 2 hours at the temperature of 150 to 250° C. The atmosphere in which the heat treatment is performed is, for example, an inert gas atmosphere, where a small amount of oxygen or hydrogen may be contained in the inert gas atmosphere.

Before the formation of the evaporated film of the stimulable phosphor, it is possible to form another evaporated film which is made of only the at least one basic compound of the stimulable phosphor. Such an evaporated film made of only the at least one basic compound of the stimulable phosphor is generally formed of an aggregation of columnar or globular crystals, and therefore it is possible to improve the columnar crystallinity of the evaporated film of the stimulable phosphor formed on the evaporated film made of only the at least one basic compound of the stimulable phosphor. Since the heating of the substrate during the evaporation and/or the heat treatment after the evaporation can cause diffusion of the additives including the activator contained in the evaporated film of the stimulable phosphor into the evaporated film made of only the at least one basic compound of the stimulable phosphor, the boundary between the evaporated film made of only the at least one basic compound and the evaporated film of the stimulable phosphor becomes unclear.

In the case where a single evaporation source is used, the stimulable phosphor per se or a mixture of the raw materials of the stimulable phosphor is contained in the evaporation source, and heated with a single resistance heater. The evaporation source is controlled in advance so as to contain an activator with a desired concentration. Alternatively, in consideration of the difference in the evaporation rate between the basic compound of the stimulable phosphor and at least one component of the activator, it is possible to perform evaporation while supplying the basic compound of the stimulable phosphor to the evaporation source.

Through the above process, it is possible to obtain a fluorescent layer in which the columnar crystals of the stimulable phosphor are grown almost in the thickness direction. The fluorescent layer does not contain a binder, and is made of only the stimulable phosphor, and there are gaps between the columnar crystals. Although the appropriate thickness of the fluorescent layer varies with the characteristics of the desired radiation-image conversion panel, the means and conditions of evaporation, and the like, the thickness of the fluorescent layer is normally 50 micrometers to 1 millimeters, and preferably 200 to 700 micrometers.

The substrate on which the fluorescent layer is formed may not be used as the support for the radiation-image conversion panel. For example, it is possible to separate the fluorescent layer from the substrate after the formation of the fluorescent layer, and arrange the fluorescent layer on a support which is separately prepared, by bonding the fluorescent layer to the support with an adhesive or the like.

The method for the vapor deposition is not limited to the evaporation using the resistance heating, and may be any of the known techniques such as evaporation by bombardment with an electron beam, sputtering, or CVD (chemical vapor deposition).

The stimulable-phosphor layer may be formed by any of the known techniques such as application or sintering. For example, when the stimulable-phosphor layer is formed by application, a solution to be applied is prepared by dissolving the binder material and dispersing a particulate stimulable phosphor in an appropriate organic solvent. The ratio between the stimulable phosphor and the binder in the solution is normally 1:1 to 1:100 (by weight), and preferably 1:8 to 1:40. Various types of resin materials are known for use as the binder which supports the dispersed particles of the stimulable phosphor, and it is possible to appropriately choose an arbitrary one of resin materials including the known resin materials for use in the formation of the fluorescent layer in the radiation-image conversion panel according to the present invention. In addition, it is also possible to appropriately choose an arbitrary one of the known organic solvents for use in production of the solution for application. Further, various additives may be mixed into the solution for application. The additives may include a dispersing agent for enhancing dispersibility of the stimulable phosphor in the solution, a plasticizer for increasing the binding strength between the binder and the stimulable phosphor in the formed fluorescent layer, an agent for preventing yellowing (discoloration) of the fluorescent layer, a curing agent, a cross-linking agent, and the like.

Next, the above solution is uniformly applied to a surface of the support with a conventional means for application such as the doctor blade, the roll coater, the knife coater, and the like. The formation of the stimulable-phosphor layer on the support is completed by drying the film coated as above. Although the thickness of the stimulable-phosphor layer is changed depending on the characteristics of the desired radiation-image conversion panel, the type of the stimulable phosphor, the mixing ratio of the binder and the stimulable phosphor, and the like, the thickness of the stimulable-phosphor layer is normally 20 micrometers to 1 millimeter, and preferably 50 to 500 micrometers. The stimulable-phosphor layer may be formed of more than one sublayer. In such a case, it is possible to arbitrarily differentiate the type and the particle diameter of the stimulable phosphor, the mixing ratio of the binder and the stimulable phosphor, and the like in each sublayer.

For convenience of transportation and handling of the radiation-image conversion panel and prevention of variation in the characteristics of the radiation-image conversion panel, a protective layer is provided on a surface of the stimulable-phosphor layer. As explained before, according to present invention, the protective layer has a reflectance of 3% or lower at a wavelength of light emitted from the stimulable phosphor and a water-vapor transmission rate of 1 g/m$^2$/24 h or lower at 40° C. That is, the protective layer also has the functions of an antireflection layer and a vapor-barrier layer. It is preferable that the protective layer is transparent so that the protective layer hardly affects the injection of excitation light and the emission of the luminescence. In addition, it is also preferable that the protective layer is chemically stable and has high physical strength so that the protective layer can satisfactorily protect the radiation-image conversion panel from externally exerted physical impacts and chemical influences.

The protective layer can be arranged by forming a protective sheet on a surface of a transparent substrate made of one of the aforementioned materials, and bonding the protective sheet to a surface of the stimulable-phosphor layer with an appropriate adhesive. The protective sheet can be produced by alternately forming at least one first sublayer and at least one second sublayer on the surface of the transparent substrate, where each of the at least one first sublayer is made of an inorganic material having a high refractive index, each of the at least one second sublayer is made of an inorganic material having a low refractive index. The inorganic material having a high refractive index is, for example, $TiO_2$, ITO (a composite tin-indium oxide), $CeO_2$, $Sb_2O_5$, $SnO_2$, $In_2O_3$, $Y_2O_3$, $La_2O_3$, $HfO_2$, or $ZrO_2$, and $TiO_2$ and ITO are particularly preferable. The inorganic material having a low refractive index is, for example, $SiO_x$ ($1.5 \leq x \leq 2.0$), $Al_2O_3$, $MgF_2$, or a combination of these materials. From the viewpoint of the low water-vapor transmission rate, $SiO_x$ and a mixture of $SiO_x$ and $Al_2O_3$ are particularly preferable. When a film of the above materials is formed with a high density of 1.9 to 4.2 g/cm$^3$, the film has a low water-vapor transmission rate. Such a film having a low water-vapor transmission rate and a high density can be formed by plasma CVD, or sputtering in a vacuum having a inert gas pressure of 0.01 to 1 Pa (in an inert gas atmosphere). Alternatively, in the case where the protective layer has a single-layer structure, the protective layer can be formed by using a material having a refractive index lower than that of the transparent substrate, which may be one of the above-mentioned inorganic materials having a low refractive index. Further, in some cases, the protective layer can be formed by using one of the above-mentioned inorganic materials having a high refractive index. Generally, the total thickness of the protective layer formed as above is about 1 to 500 micrometers, and preferably 5 to 10 micrometers from the viewpoint of the optical characteristics (e.g., prevention of image blur).

A number of variations of radiation-image conversion panels are known. Although the radiation-image conversion panel according to the first aspect of the present invention can be obtained as explained above, it is possible to implement one or more of the known variations in the radiation-image conversion panel according to the present invention. For example, in order to improve the sharpness of images, it is possible to color at least one of the layers constituting the radiation-image conversion panel with a coloring agent which absorbs the excitation light and does not absorb the luminescence.

Hereinbelow, examples of the radiation-image conversion panel according to the first embodiment of the present invention are explained in comparison with some comparison examples.

EXAMPLES OF THE FIRST EMBODIMENT OF THE PRESENT INVENTION

Example 1

(1) Formation of Fluorescent Layer

As the evaporation sources, a powder of cesium bromide (CsBr) with the purity of 4N or higher and a powder of europium bromide (EuBr$_2$) with the purity of 3N or higher are prepared, and minor elements in each of the above powders are analyzed by the inductively coupled plasma mass spectrometry (ICP-MS). The result of the analysis shows that in CsBr, the content of each of alkali metal elements (Li, Na, K, and Rb) other than Cs is 10 ppm or less, and the content of each of the other elements including alkaline-earth metal elements (Mg, Ca, Sr, and Ba) is 2 ppm or less. In addition, in $EuBr_2$, the content of each of the rare-earth elements other than Eu is 20 ppm, and the content of each of the other elements is 10 ppm or less. Since the above powders are highly hygroscopic, these powders are stored in a desiccator in which a dry atmosphere having a dew point of −20° C. or lower is maintained, and each powder is taken out immediately before use.

As the support, a quartz glass substrate, which is alkali-cleaned, pure-water cleaned, and IPA (isopropyl alcohol) cleaned in this order, is prepared, and set in a substrate holder in an evaporation system. After melting pots in the evaporation system are filled with the CsBr evaporation source and the $EuBr_2$ evaporation source, the evaporation system is evacuated to a vacuum of $1\times10^{-3}$ Pa by using an evacuating system realized by a combination of a rotary pump, a mechanical booster, and a turbo-molecular pump. Thereafter, Ar gas having the purity of 5N is introduced into the evaporation system so as to realize the Ar gas pressure of 0.8 Pa. The substrate is heated to the temperature of 100° C. with a sheathed heater which is arranged on the side of the substrate opposite to the surface to be evaporated. Each of the evaporation sources is heated with a resistance heater so that the stimulable phosphor CsBr:Eu is deposited on the surface of the substrate at the rate of 5 μm /min. At this time, the resistance currents of the resistance heaters are adjusted so that the mole ratio of Eu to Cs in the stimulable phosphor becomes 0.01:1. The start of the evaporation of CsBr and the start of the evaporation of $EuBr_2$ are controlled by opening and closing shutters of the melting pots. After completion of the evaporation, the atmospheric pressure is restored in the evaporation system, and the substrate is taken out of the evaporation system. The applicants have confirmed formation of a stimulable-phosphor layer having a thickness of 200 micrometers, a surface area of 10×10 cm, and a structure in which columnar crystals of the stimulable phosphor are closely arrayed and stand in approximately vertical directions.

(2) Formation of Protection Layer

A layer of $SiO_x$ ($x \approx 1.5$ to 2) having a thickness of 100 micrometers is formed by sputtering on a surface of a transparent film (as a substrate) of PET (polyethylene terephthalate) having a thickness of 6 micrometers. The sputtering is performed in an atmosphere with an Ar gas pressure of 0.03 Pa. Then, a $TiO_2$ layer having a thickness of 25 nm is formed on the $SiO_x$ film by evaporation, an $SiO_x$ layer having a thickness of 150 nm is formed on the $TiO_2$ layer by sputtering, and a $TiO_2$ layer having a thickness of 80 nm is formed on the $SiO_x$ film by evaporation. Thus, a protective sheet is formed. Next, the protective sheet is bonded to an upper surface and side surfaces of the stimulable-phosphor layer with an adhesive in such a manner that the PET film in the protective sheet is in contact with the stimulable-phosphor layer.

Thus, a radiation-image conversion panel constituted by the support, the stimulable-phosphor layer, and the protective layer as illustrated in FIGS. 1 and 2 is produced.

Example 2

The radiation-image conversion panel as the example 2 is different from the radiation-image conversion panel as the example 1 only in the manner of fixing the protective sheet to the stimulable-phosphor layer. That is, in the process of forming the protective layer in the example 2, the protective sheet is fixed to the upper surface and side surfaces of the stimulable-phosphor layer by vacuum sealing (i.e., forming an opening at an end of the protective sheet for evacuation, attaching the protective sheet to the stimulable-phosphor layer, performing evacuation through the opening, and closing the opening with a stopper so as to seal the stimulable-phosphor layer in the protective sheet.

Example 3

The radiation-image conversion panel as the example 3 is different from the radiation-image conversion panel as the example 1 only in the protective layer. That is, in the process of forming the protective layer in the example 3, an ITO layer having a thickness of 25 nm, an $SiO_2$ layer having a thickness of 25 nm, and an ITO layer having a thickness of 85 nm are formed on a surface of a transparent PET film in this order by sputtering. Then, a silica ($SiO_2$) layer having a thickness of 95 nm is formed by plasma CVD. Thus, a protective sheet is produced. Next, the protective sheet is bonded to an upper surface and side surfaces of the stimulable-phosphor layer with an adhesive in such a manner that the PET film in the protective sheet is in contact with the stimulable-phosphor layer.

Example 4

The radiation-image conversion panel as the example 4 is different from the radiation-image conversion panel as the example 3 only in the manner of fixing the protective sheet to the stimulable-phosphor layer. That is, in the process of forming the protective layer in the example 4, the protective sheet is fixed to the upper surface and side surfaces of the stimulable-phosphor layer by vacuum sealing (i.e., forming an opening at an end of the protective sheet for evacuation, attaching the protective sheet to the stimulable-phosphor layer, performing evacuation through the opening, and closing the opening with a stopper so as to seal the stimulable-phosphor layer in the protective sheet.

Comparison Example 1

The radiation-image conversion panel as the comparison example 1 is different from the radiation-image conversion panel as the example 1 only in that a transparent PET film having a thickness of 6 micrometers, instead of the protective sheet, is bonded to the upper surface and side surfaces of the stimulable-phosphor layer with an adhesive.

Comparison Example 2

The radiation-image conversion panel as the comparison example 2 is different from the radiation-image conversion panel as the example 1 only in that a transparent PET film having a thickness of 6 micrometers, instead of the protective sheet, is bonded to the upper surface and side surfaces of the stimulable-phosphor layer with an adhesive, and a haze layer being made of a fluorocarbon copolymer resin containing an organic filler and having a haze value of 45% and a thickness of 5 micrometers is attached to the transparent PET film.

[Performance Evaluation of Protection Layer]

The light reflectance and the water-vapor transmission rate of the protective sheet produced in each of the examples 1 to 4 have been measured as explained below. In addition, the transparent PET film (having a thickness of 12 micrometers) has also been measured for comparison.

(1) Light Reflectance

The maximum value of the light reflectance of each protective sheet at the wavelength of 440 nm (the emission wavelength of the stimulable phosphor CsBr:0.01Eu) has been measured by using a spectrophotometer.

(2) Water-vapor Transmission Rate

The water-vapor transmission rate of each protective sheet has been measured by sealing $CaCl_2$ with the protective sheet, leaving the sealed $CaCl_2$ for two weeks in an environment at the temperature of 40° C. and the relative humidity (RH) of 90%, measuring the amount of moisture absorption by $CaCl_2$, and calculating the water-vapor transmission rate based on the amount of moisture absorption.

The values of the light reflectance and the water-vapor transmission rate obtained as above are summarized in Table 1.

TABLE 1

| Example | Light Reflectance (%) | Water Vapor Transmission Rate (g/m$^2$/24 hrs) |
|---|---|---|
| Examples 1 & 2 | 1 | 0.05 |
| Examples 3 & 4 | 1 | 0.1 |
| Thin Transparent Film | 6 | 30 |

Based on the results indicated in Table 1, it is understood that the protective layer in each radiation-image conversion panel according to the present invention (the protective sheet in each of the examples 1 to 4) has a light reflectance not exceeding 3% and a water-vapor transmission rate not exceeding 0.1 g/m$^2$/24 h. That is, the light reflectance and the water-vapor transmission rate of the protective layer in each of the examples 1 to 4 are satisfactory. On the other hand, in the transparent PET film, which is a conventionally known protective layer, both of the light reflectance and the water-vapor transmission rate are high, i.e., unsatisfactory.

[Performance Evaluation of Radiation-image Conversion Panel]

The sharpness, image quality, and resistance to moisture of the radiation-image conversion panel in each of the examples 1 to 4 have been evaluated as follows.

(1) Sharpness

After X rays are applied to each radiation-image conversion panel through a CTF (contrast transfer function) chart, the radiation-image conversion panel is excited with linearly arrayed laser diodes having an emission wavelength of 650 nm, stimulated luminescence emitted from the radiation-image conversion panel is received and converted to an electric signal by a CCD line sensor, and an image is reproduced on a film based on the electric signal. The applicants have evaluated the sharpness of the obtained image at the spatial frequency of 2 cycles/mm by using the modulation transfer function (MTF), and the evaluated results are represented by the following numbers, where the number representing the sharpness of the comparison example 1 is assumed to be zero.

+2: Highly Superior
+1: Superior
−1: Inferior
−2: Highly Inferior (2) Image Quality After X rays are applied to each radiation-image conversion panel, an image is reproduced on a film in a similar manner to the case of the evaluation of sharpness. The applicants have made a visual inspection of the obtained image, and evaluated the quality of the obtained image as indicated below.

A: Free from unevenness and defects.
B: Some insignificant unevenness or defects exist.
C: Significant unevenness or defects exist.

(3) Moisture Resistance (Durability)

The amount of the stimulated luminescence emitted from each radiation-image conversion panel is measured in a similar manner to the cases of the evaluation of sharpness and image quality. Next, the radiation-image conversion panel is left in an environment at the temperature of 30° C. and the relative humidity (RH) of 80% for a month. Thereafter, the amount of the stimulated luminescence emitted from the radiation-image conversion panel is measured again in a similar manner to the above, and the difference between the amounts of the stimulated luminescence before and after the one-month period for which the radiation-image conversion panel is left is obtained. The applicants have evaluated the moisture resistance (durability) of the radiation-image conversion panel as indicated below.

A: Decrease of 5% or Less in the Amount of Emission
B: Decrease of 5% or Between 5% and 10% in the Amount of Emission
C: Decrease of 10% or More in the Amount of Emission The results of the performance evaluation of the radiation-image conversion panels obtained as above are summarized in Table 2.

TABLE 2

| Example | Sharpness | Image Quality | Moisture Resistance |
|---|---|---|---|
| Example 1 | +2 | A | A |
| Example 2 | +2 | A | A |
| Example 3 | +2 | A | B |
| Example 4 | +2 | A | B |
| Comparison Example 1 | 0 | C | C |
| Comparison Example 2 | +1 | B | C |

The results indicated in Table 2 clearly show that the radiation-image conversion panels (as the examples 1 to 4) according to the present invention are superior to the conventional radiation-image conversion panel (as the comparison example 1) having the conventional protective layer in the sharpness, the image quality (based on the unevenness and defects), and the moisture resistance. On the other hand, the radiation-image conversion panel as the comparison example 2 in which the haze layer is attached to the protective layer is improved in the sharpness and the image quality, compared with the comparison example 1. However, the moisture resistance of the radiation-image conversion panel as the comparison example 2 is unsatisfactory.

Second Embodiment

Next, the radiation-image conversion panel according to the second embodiment of the present invention corresponding to the aforementioned second aspect of the present invention is explained in detail below.

As mentioned before, the radiation-image conversion panel according to the second aspect of the present invention is characterized in that the protective layer is obtained by attaching a removable film to a thin transparent film so as to produce a laminated film, forming a vapor-barrier layer on an exposed surface of the thin transparent film which constitutes the laminated film by vacuum deposition so as to produce a moisture-resistant film, placing the moisture-resistant film on the stimulable-phosphor layer, and removing the removable film from the moisture-resistant film.

Since the removable film is removed before the protective layer is finally arranged in the radiation-image conversion panel, the removable film is not required to be transparent. The thickness of the removable film is 10 to 500 micrometers, and preferably 20 to 150 micrometers. If the thickness of the removable film is smaller than 10 micrometers, it is difficult to handle the removable film for attaching the removable film to the thin transparent film. On the other hand, if the thickness of the removable film is greater than 500 micrometers, it is difficult to separate the removable film from the thin transparent film and roll up the removable film after the formation of the laminated film. Therefore, it is unpreferable that the thickness of the removable film is smaller than 10 micrometers or greater than 500 micrometers.

Preferably, the removable film is made by using a plastic including an olefin-based plastic such as polyethylene or polypropylene, a vinyl-based plastic such as polyvinyl chloride or polyacrylonitrile, a polyester-based plastic such as polyethylene terephthalate or polybutylene terephthalate, a polyurethane-based plastic, an acryl-based plastic, a polycarbonate containing bisphenol A as a bisphenol component.

Further, it is also preferable to form the removable film by using the following materials:

(i) Plastics such as a polyalylate or a polycarbonate or a polyestercarbonate each containing, as a portion of a bisphenol component, a bisphenol having an unsubstituted or substituted cycloalkylidene group, or an alkylidene group or aralkylene group which has five or more carbon atoms. Specifically, the above plastics may be a polyalylate or a polycarbonate or a polyestercarbonate each containing, as a bisphenol component, 1,1-bis(4-hydroxyphenyl)-cyclohexthane, 1,1-bis(4-hydroxyphenyl)-3,3,5-trimethylcyclohexthane, 3,3-bis(4-hydroxyphenyl)-pentane, 4,4-bis(4-hydroxyphenyl)-heptane, bis(4-hydroxyphenyl)-phenylmethane;

(ii) Polyether sulfone, polysulfone, polyamide, cellulose triacetate, and the like; and (iii) Cycloolefin-based or norbornene-based plastics, and amorphous polyester-based plastics having a fluorene skeleton.

Furthermore, it is particularly preferable that the removable film is formed by using the olefin-based plastic such as polyethylene or polypropylene and the polyester-based plastic such as polyethylene terephthalate or polybutylene terephthalate.

The removable film is laminated to the thin transparent film after an adhesive layer is formed on a surface of the removable film. The known adhesives such as acryl-based or silicon-based adhesives can be used. However, in some of the known adhesives, during the above process, foam is produced, or the adhesive strength increases so that the removal of the removable film becomes uneasy. Therefore, it is necessary to choose an adhesive which can sustain under the conditions imposed on the adhesive by the above process. In addition, if the adhesive remains on the surface of the thin transparent film after the removable film is removed from the surface, the adhesive impairs the transparency of the radiation-image conversion panel, and harmfully affects the quality and the sharpness of images obtained through the radiation-image conversion panel. Therefore, the adhesive is required to be completely removed from the surface of the thin transparent film when the removable film is removed. Thus, it is desirable to perform preprocessing of the surface on which the adhesive layer is to be formed, for enhancing affinity of the surface of the removable film for the adhesive. For example, the preprocessing is a corona treatment or the like.

Alternatively, in the case where the adhesive does not remain on the surface of the thin transparent film after the removal of the removable film, it is possible to laminate the removable film to a surface of the thin transparent film after the surface of the thin transparent film is processed so that the surface of the thin transparent film becomes adhesive.

In addition, in order to stabilize the quality of the laminated film, it is preferable to heat the films during the laminating operation. Further, if a foreign material is rolled in during the laminating operation, a spot caused by the foreign material can be transferred to the thin transparent film by the laminating operation, and produce an optical defect. Therefore, it is preferable that the known measures are taken for eliminating foreign materials from the films and the environment.

It is preferable that the force necessary for removing from the thin transparent film the removable film processed as above is small. However, if the force is too small, problems such as production of foam are likely to occur during the process of producing the laminated film. On the other hand, the above force is too great, other problems such as deformation of the thin transparent film are likely to occur when the removable film is removed. Therefore, the force necessary for removing the removable film is preferably 10 g/25 mm to 70 g/25 mm, and more preferably 15 g/25 mm to 50 g/25 mm.

The thin transparent film can be realized by using one of the known films as far as the films have sufficient strength, transparency, and chemical stability. Specifically, the thin transparent film can be made of an arbitrary one of polyethylene terephthalate (PET), polyethylene naphthalate, polyamide, polyimide, aramid resin, polycarbonate, polyethylene, polyurethane, polypropylene, polyvinylidene chloride, and the like.

Although the appropriate thickness of the thin transparent film varies with the material of which the thin transparent film is made, it is preferable that the thickness of the thin transparent film is smaller than that of the removable film. Specifically, the thickness of the thin transparent film is preferably 10 micrometers or smaller, and more preferably 2 to 7 micrometers.

The vapor-barrier layer, which is formed by vacuum deposition, can be made of an inorganic material such as a metal oxide, a metal nitride, or a metal oxynitride. Specifically, it is preferable that the vapor-barrier layer is a transparent evaporated layer produced by evaporation of an inorganic material which exhibits low absorption of light having the wavelengths of 300 to 1,000 nm and has a gaseous barrier property. For example, silicon oxide, silicon nitride, aluminum oxide, aluminum nitride, zirconium oxide, tin oxide, silicon oxynitride, aluminum oxynitride, and the like are preferable inorganic materials which exhibit low absorption of light having the wavelengths of 300 to 1,000 nm. Especially, aluminum oxide, silicon oxide, and silicon oxynitride exhibit highly transparent to light and has a gaseous barrier property. That is, a fine film which has very small number of cracks or micropores can be formed of aluminum oxide, silicon oxide, or silicon oxynitride. Therefore, it is particularly preferable that the thin transparent film is made of aluminum oxide, silicon oxide, and silicon oxynitride.

In the case where a plurality of vapor-barrier layers are laminated, transparent inorganic layers realizing the plurality of vapor-barrier layers may be made of either identical or different materials.

In the case where a plurality of vapor-barrier layers are laminated, it is possible to arrange between the plurality of vapor-barrier layers a layer of a composite compound of organic and inorganic materials, which is a layer made of a composite material constituted by at least one organic material and at least one inorganic material. When such a layer is arranged, defects in the inorganic layers can be filled in, and the inorganic layers can maximumly exert their functions of moisture resistance. Therefore, it is possible to prevent deterioration of the fluorescent layer caused by moisture absorption for a long time, and realize a high-quality radiation-image conversion panel.

The above layer of a composite compound of organic and inorganic materials can be made of composite materials constituted by various organic materials and various inorganic materials, as far as the radiation and the stimulated luminescence pass through the composite materials. The at least one inorganic material constituting the composite material is, for example, at least one of (a) a powder of the material of which the aforementioned vapor-barrier layers are formed, such as silicon oxide, (b) at least one metal alkoxide and at least one hydrolysate of the at least one metal alkoxide, and (c) tin chloride. On the other hand, the at least one organic material constituting the composite material is, for example, polyvinyl alcohol (PVA), methylcellulose, or the like.

The layer of the composite compound constituted by the at least one organic material and at least one inorganic material is formed, for example, by preparing a water solution or an alcohol/water solution of the at least one organic material and the at least one inorganic material, and applying a coating agent containing the solution as a main part. The concrete manner of forming the above layer is not specifically limited. For example, various techniques for application such as the sol-gel method, gravure coating, roll coating, doctor-blade coating, dip coating, slide coating, and extrusion coating, and various techniques for film formation such as the screen-printing method and the spray method can be used for forming the above layer.

Although the thickness of the above layer of the composite compound constituted by the at least one organic material and at least one inorganic material is not specifically limited, it is preferable that the thickness of the above layer is 0.3 to 1 micrometer from the viewpoint that satisfactory performance of moisture resistance can be achieved and increase in the total thickness of the protective layer can be avoided.

In addition, the ratio of the content of the at least one organic material to the content of the at least one inorganic material in the above layer of the composite compound constituted by the at least one organic material and at least one inorganic material is preferably 10 to 50% by weight, and more preferably 20 to 40% by weight from the viewpoint that the layer of the composite compound per se can exert the function of moisture resistance and behave as a barricade in the protective layer.

Hereinbelow, the radiation-image conversion panel according to the second embodiment of the present invention corresponding to the aforementioned second aspect of the present invention and processes of producing the radiation-image conversion panel according to the second embodiment of the present invention are explained in detail below.

FIGS. 3A to 3E are schematic cross-sectional views of representative stages in the first process of producing the radiation-image conversion panel according to the second embodiment of the present invention, where the first process corresponds to the aforementioned third aspect of the present invention.

Figure 3A:
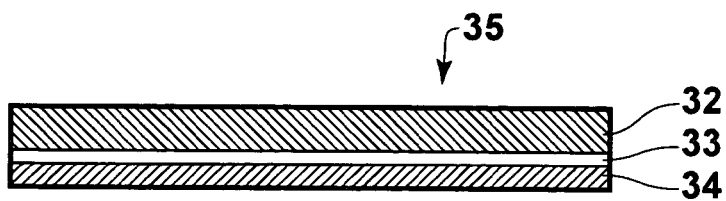
FIGS. 3A to 3E are schematic cross-sectional views of representative stages in a first process of producing a radiation-image conversion panel according to a second embodiment of the present invention corresponding to the aforementioned third aspect of the present invention.
Figure 3B:
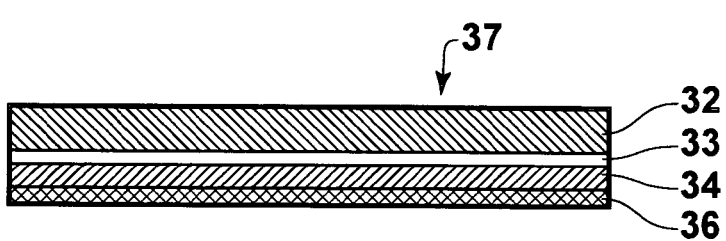
Figure 3C:
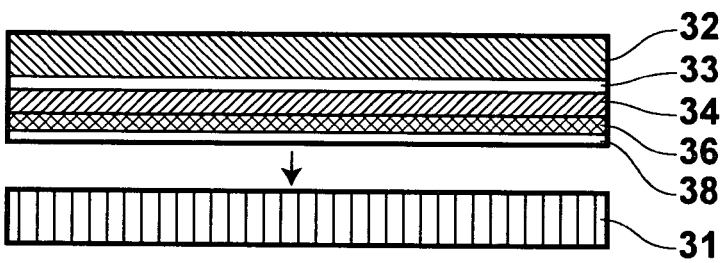
Figure 3D:
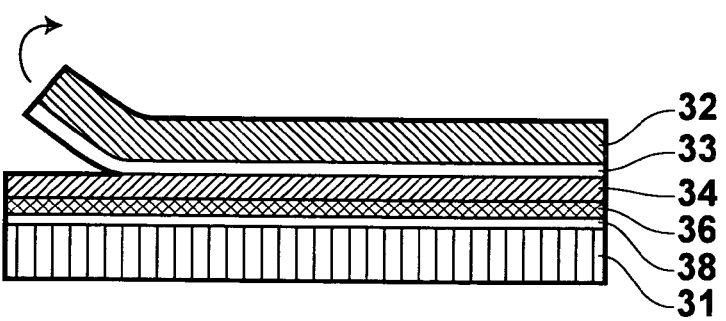
Figure 3E:
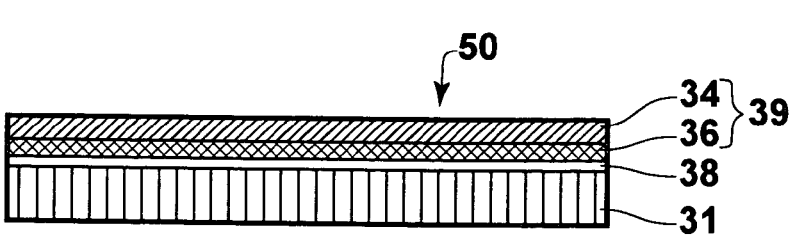

As illustrated in FIG. 3A, a laminated film 35 is produced by adhering a thin transparent film 34 to a removable film 32 through an adhesive layer 33. Subsequently, as illustrated in FIG. 3B, a moisture-resistance film 37 is produced by forming a vapor-barrier layer 36 on the exposed surface of the thin transparent film 34 in the laminated film 35 by vacuum deposition. Then, as illustrated in FIG. 3C, an adhesive layer 38 is formed on the exposed surface of the vapor-barrier layer 36 in the moisture-resistance film 37, the moisture-resistance film 37 is positioned above a stimulable-phosphor layer 31 so that the adhesive layer 38 faces the stimulable-phosphor layer 31, and the moisture-resistance film 37 is laminated to the stimulable-phosphor layer 31. After the moisture-resistance film 37 is adhered to the stimulable-phosphor layer 31, the removable film 32, together with the adhesive layer 33, is removed from the thin transparent film 34 as illustrated in FIG. 3D. Thus, a radiation-image conversion panel 10 having a protective layer 39 constituted by the thin transparent film 34 and the vapor-barrier layer 36 is obtained as illustrated in FIG. 3E.

Although FIGS. 3A to 3E show a process of producing a radiation-image conversion panel in which a vapor-barrier layer is arranged between the stimulable-phosphor layer 31 and the thin transparent film 34, alternatively, it is possible to arrange vapor-barrier layers on both sides of the thin transparent film 34. FIGS. 4A to 4F are schematic cross-sectional views of representative stages in a process of producing a protective layer, where vapor-barrier layers are formed on both sides of a thin transparent film.

Figure 4A:
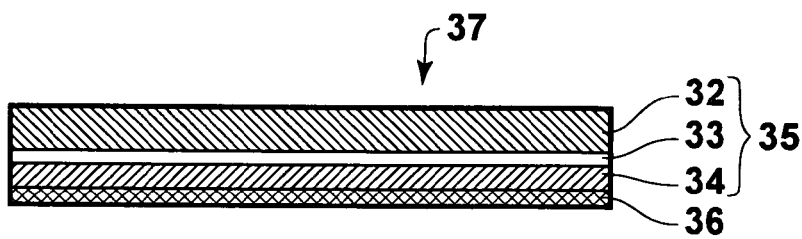
FIGS. 4A to 4F are schematic cross-sectional views of representative stages in a process of producing a protective layer, where vapor-barrier layers are formed on both sides of a thin transparent film.
Figure 4B:
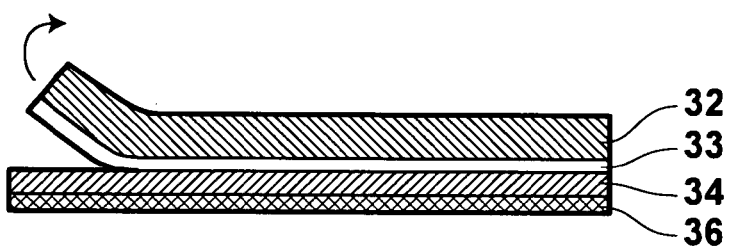
Figure 4C:
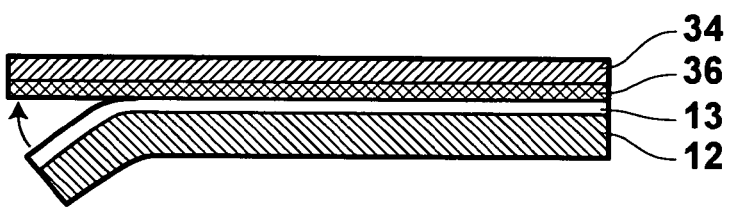
Figure 4D:
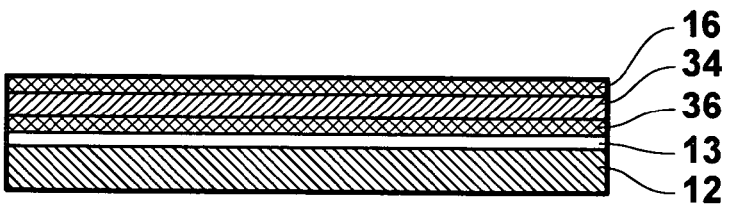
Figure 4E:
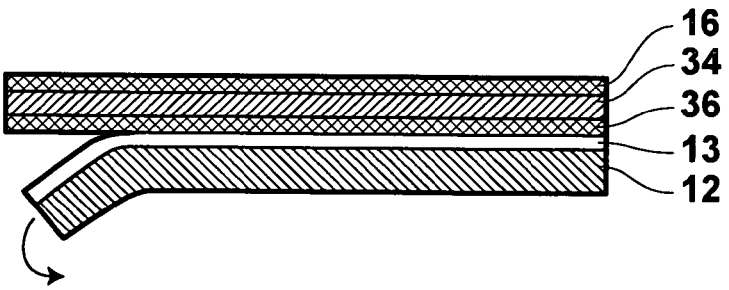
Figure 4F:
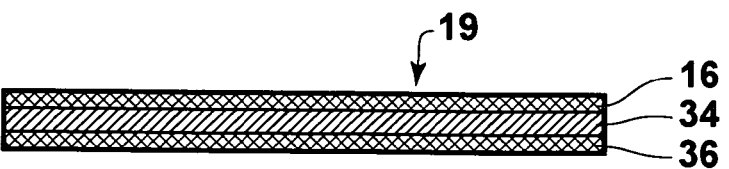

FIG. 4A shows a moisture-resistance film 37 which is produced by forming a vapor-barrier layer 36 on the exposed surface of the thin transparent film 34 in a laminated film 35 by vacuum deposition, where the laminated film 35 is produced by adhering a thin transparent film 34 to a removable film 32 through an adhesive layer 33 as in the process illustrated in FIGS. 3A to 3E. Subsequently, the removable film 32, together with the adhesive layer 33, is removed from the thin transparent film 34 as illustrated in FIG. 4B. Then, as illustrated in FIG. 4C, a thin transparent film 12, on which another adhesive layer 13 is formed, is adhered to the vapor-barrier layer 36 in the structure of FIG. 4B, and thereafter another vapor-barrier layer 16 is formed on the thin transparent film 34 as illustrated in FIG. 4D by vacuum deposition. Subsequently, the removable film 12, together with the adhesive layer 13, is removed from the thin vapor-barrier layer 36 as illustrated in FIG. 4E. Thus, a protective layer 19 having the vapor-barrier layers on both sides of the thin transparent film 34 is obtained as illustrated in FIG. 4F.

In the process illustrated in FIGS. 4A to 4F, the removable film 12, together with the adhesive layer 13, is removed from the thin vapor-barrier layer 36 before the moisture-resistant film is laminated to the stimulable-phosphor layer after the vapor-barrier layer 16 is formed. That is, it is possible to remove a removable film before the moisture-resistant film is laminated to the stimulable-phosphor layer, and thereafter arrange on the stimulable-phosphor layer the thin transparent film having a vapor-barrier layer.

Although, in the above processes illustrated in FIGS. 3A to 3E and FIGS. 4A to 4F, a vapor-barrier layer is formed on one or each side of the thin transparent film, alternatively, it is possible to form an arbitrary number of vapor-barrier layers, or arrange a gas-barrier layer, which is conventionally known as a protective layer.

Further, the radiation-image conversion panel according to the second aspect of the present invention can also be produced through the process illustrated in FIGS. 5A to 5E, which are schematic cross-sectional views of representative stages in the second process of producing a radiation-image conversion panel, where the second process illustrated in FIGS. 5A to 5E corresponds to the aforementioned fourth aspect of the present invention. The radiation-image conversion panel produced by the process illustrated in FIGS. 5A to 5E is as a first variation of the second embodiment of the present invention corresponding to the aforementioned second aspect of the present invention.

In the radiation-image conversion panel produced by the process illustrated in FIGS. 5A to 5E, a stimulable-phosphor layer 31 is formed on a substrate 21, and a sealing frame 22 is arranged on an area of the upper surface of the substrate 21 on which the stimulable-phosphor layer 31 is not arranged. A protective layer 39 is bonded to the sealing frame 22 with an adhesive, and the stimulable-phosphor layer 31 is sealed with the substrate 21 and the protective layer 39.

Figure 5A:
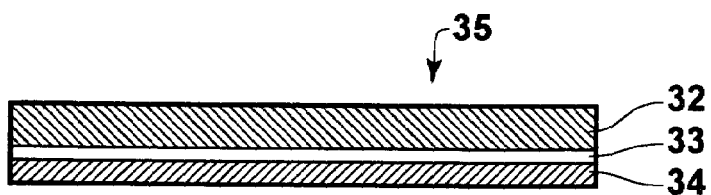
FIGS. 5A to 5E are schematic cross-sectional views of representative stages in a second process of producing a radiation-image conversion panel as a first variation of the second embodiment of the present invention corresponding to the aforementioned second aspect of the present invention.
Figure 5B:
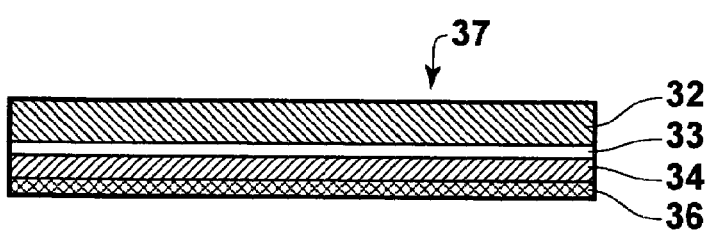
Figure 5C:
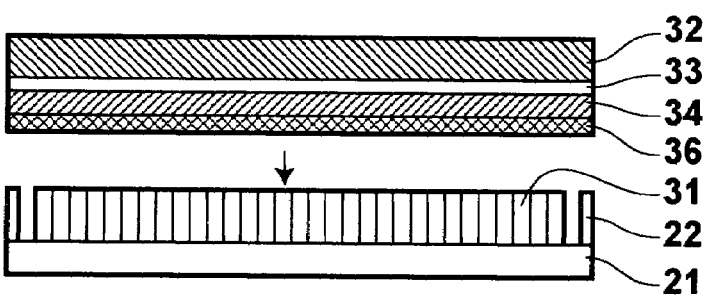
Figure 5D:
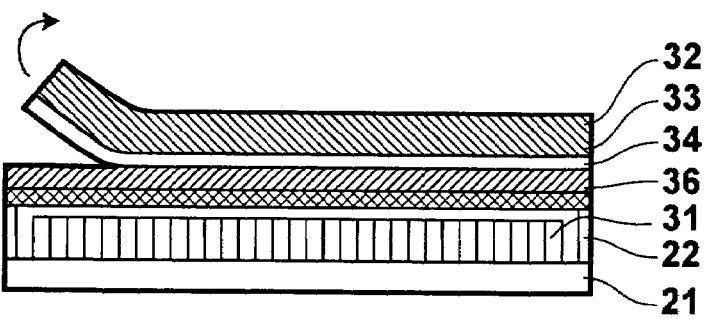
Figure 5E:
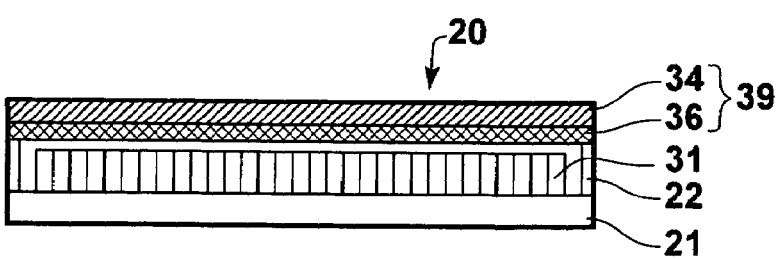

The process illustrated in FIGS. 5A to 5E is similar to the process illustrated in FIGS. 3A to 5E. As illustrated in FIG. 5A, a laminated film 35 is produced by adhering a thin transparent film 34 to a removable film 32 through an adhesive layer 33. Subsequently, as illustrated in FIG. 5B, a moisture-resistance film 37 is produced by forming a vapor-barrier layer 36 on the exposed surface of the thin transparent film 34 in the laminated film 35 by vacuum deposition. Next, as illustrated in FIG. 5C, the moisture-resistance film 37 is bonded to the sealing frame 22 arranged on an area of the upper surface of the substrate 21 around the area on which the stimulable-phosphor layer 31 is arranged, and then the stimulable-phosphor layer 31 is sealed with the substrate 21, the sealing frame 22, and the moisture-resistance film 37. Thereafter, the removable film 32, together with the adhesive layer 33, is removed from the thin transparent film 34 as illustrated in FIG. 5D. Thus, a radiation-image conversion panel 20 as illustrated in FIG. 5E is obtained.

The radiation-image conversion panels in which the aforementioned layer of a composite compound of organic and inorganic materials is arranged between two vapor-barrier layers can be produced by the process illustrated in FIGS. 6A to 6E.

FIGS. 6A to 6E are schematic cross-sectional views of representative stages in the third process of producing a radiation-image conversion panel as a second variation of the second embodiment of the present invention corresponding to the aforementioned second aspect of the present invention, where the third process illustrated in FIGS. 6A to 6E corresponds to the aforementioned third aspect of the present invention.

Figure 6A:
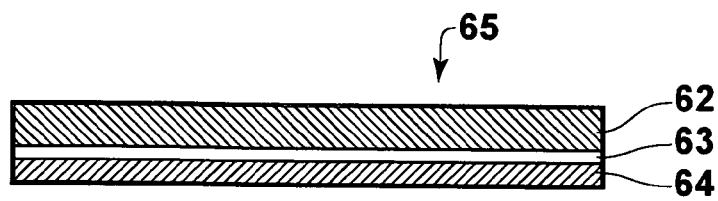
FIGS. 6A to 6E are schematic cross-sectional views of representative stages in a second process of producing a radiation-image conversion panel as a second variation of the second embodiment of the present invention corresponding to the aforementioned second aspect of the present invention.
Figure 6B:
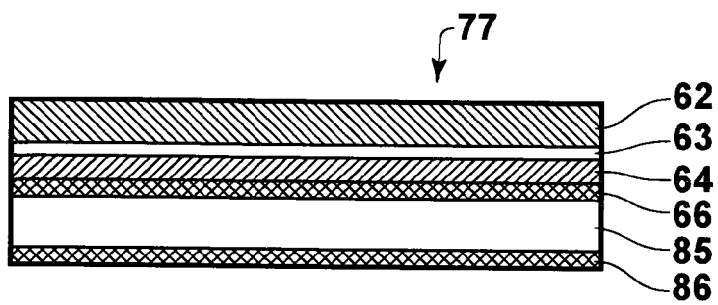
Figure 6C:
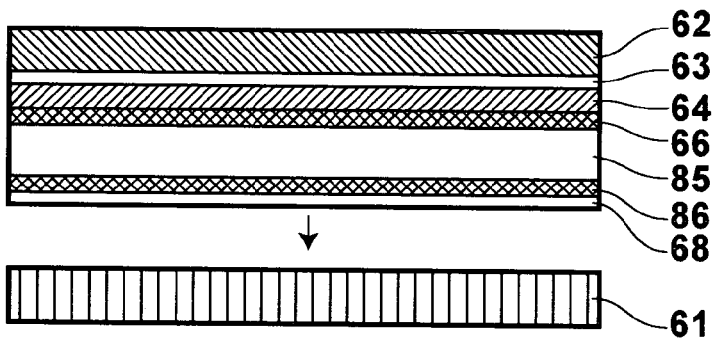
Figure 6D:
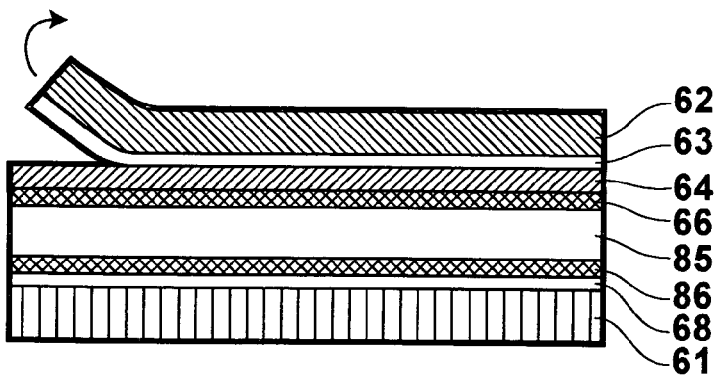
Figure 6E:
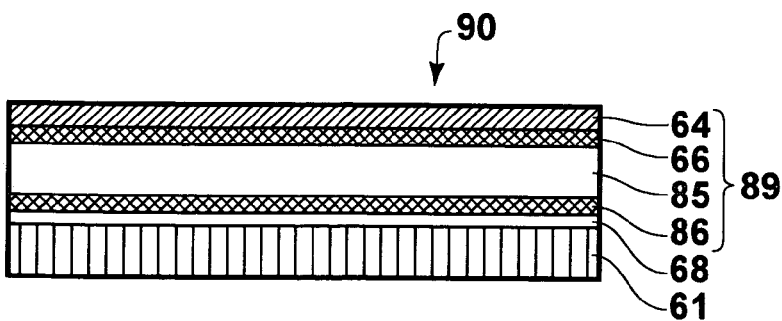

As illustrated in FIG. 6A, a laminated film 65 is produced by adhering a thin transparent film 64 to a removable film 62 through an adhesive layer 63. Subsequently, as illustrated in FIG. 6B, a moisture-resistance film 77 is produced by forming a vapor-barrier layer 66 on the exposed surface of the thin transparent film 64 in the laminated film 65 by sputtering, forming a composite-compound layer 85 on the exposed surface of the vapor-barrier layer 66 by application, and forming a vapor-barrier layer 86 on the exposed surface of the composite-compound layer 85 by sputtering. Then, as illustrated in FIG. 6C, an adhesive layer 68 is formed on the exposed surface of the vapor-barrier layer 86 in the moisture-resistance film 77, the moisture-resistance film 77 is positioned above a stimulable-phosphor layer 61 so that the adhesive layer 68 faces the stimulable-phosphor layer 61, and the moisture-resistance film 77 is laminated to the stimulable-phosphor layer 61. After the moisture-resistance film 77 is adhered to the stimulable-phosphor layer 61, the removable film 62, together with the adhesive layer 63, is removed from the thin transparent film 64 as illustrated in FIG. 6D. Thus, a radiation-image conversion panel 90 having a protective layer 69 constituted by the thin transparent film 64, the composite-compound layer 85, and the vapor-barrier layer 86 is obtained as illustrated in FIG. 6E.

The above vapor-barrier layers can be directly formed by any dry process including vacuum deposition, by which a thin film can be formed in a vacuum. Specifically, the vacuum deposition can be realized by evaporation, sputtering, PVD (physical vapor deposition), CVD (chemical vapor deposition), or the like. Since the transparency and the barrier property of the one or more inorganic layers are not greatly changed dependent on the choice of the technique realizing the vacuum deposition, the technique realizing the vacuum deposition can be chosen as appropriate. However, from the viewpoint of ease and simplicity of the formation, the CVD is most preferable. Especially, PE (plasma enhanced)-CVD, ECR (electron cyclotron resonance)-PE-CVD, and the like are preferable.

As a example of the sputtering, a process of forming an inorganic layer by impedance-controlled reactive sputtering is explained below.

According to the impedance control, a discharge voltage during reactive sputtering is maintained constant by controlling a flow rate of reactive gas such as oxygen gas while maintaining a voltage applied to a cathode constant. Originally, the impedance control is known as a technique for controlling a film-formation voltage, and developed for increasing the film-formation rate. In order to form a vapor-barrier layer having a superior gaseous barrier property, it is preferable that the film-formation pressure is 0.01 to 0.13 Pa. In particular, in the case where an $SiO_2$ layer is formed by using silicon as the target and oxygen gas as reactive gas, it is possible to form a vapor-barrier layer which has an extremely superior gaseous barrier property. The range of the preferable discharge voltage is 480 to 660 V.

Figure 7:
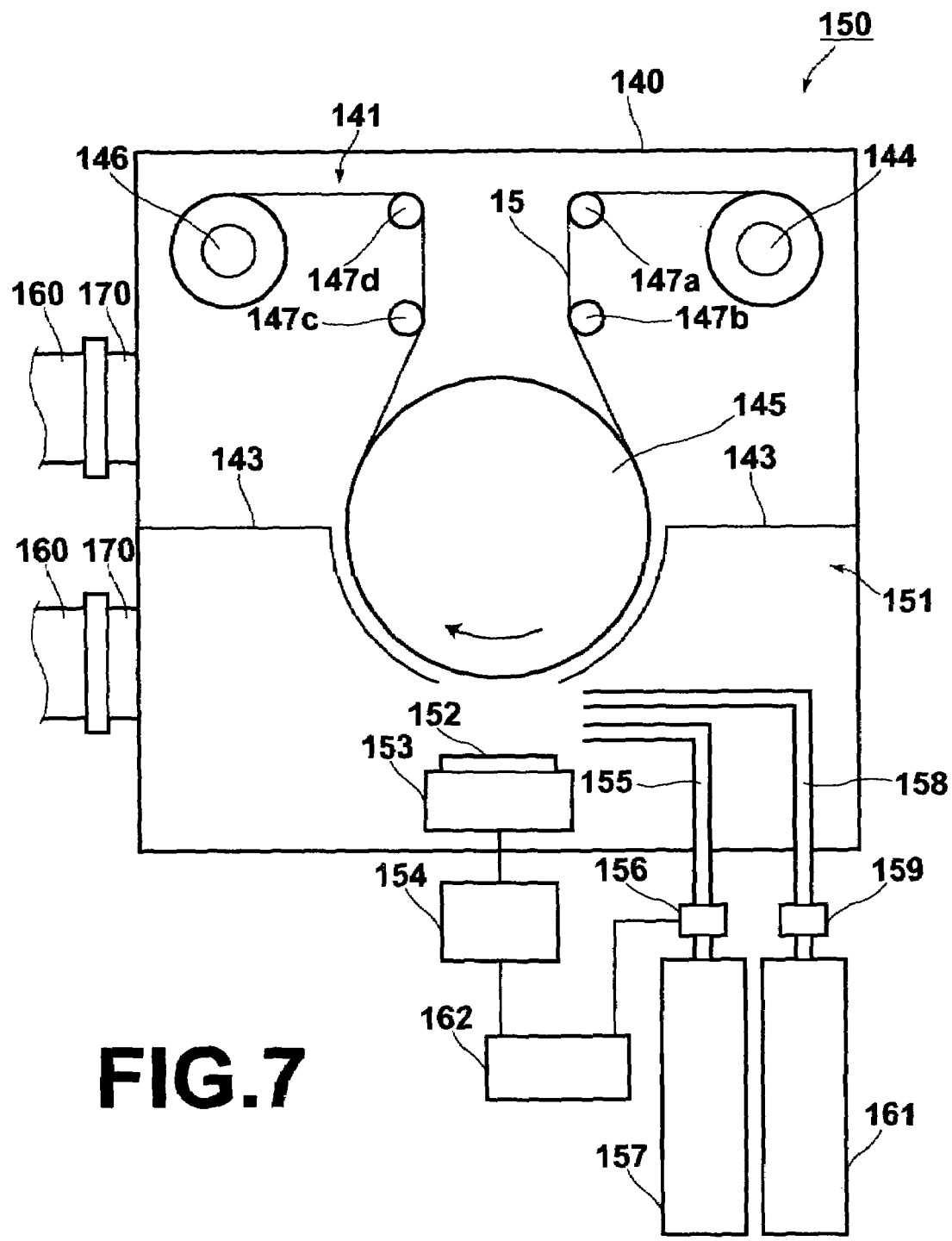
FIG. 7 is a schematic diagram illustrating of a sputtering system for performing impedance-controlled reactive sputtering.

FIG. 7 is a schematic diagram illustrating of a sputtering system for performing impedance-controlled reactive sputtering. As illustrated in FIG. 7, the sputtering system 150 comprises a vacuum chamber 140, vacuum pumps 160, a substrate-carrier system 141, and a film-formation system 151. The vacuum pumps 160 evacuate the vacuum chamber 140, and the substrate-carrier system 141 and the film-formation system 151 are arranged in the vacuum chamber 140. In the sputtering system 150, a base film 105 is moved in its length direction, and a vapor-barrier layer is formed on a surface of the base film 105 by impedance-controlled reactive sputtering, where the base film 105 is one of the laminated films in the processes illustrated in FIGS. 3A, 4A, 5A, and 6A.

The vacuum pumps 160 evacuate the vacuum chamber 140 through the evacuation outlet 170. In the vacuum chamber 140, the substrate-carrier system 141 and the film-formation system 151 are almost airtightly separated with a bulkhead 143 (and a drum 145, which is explained later) in the vacuum chamber 140. The vacuum pumps 160 include two vacuum pump respectively corresponding to the substrate-carrier system 141 and the film-formation system 151.

The substrate-carrier system 141 is provided for carrying the base film 105 in the length direction, where the base film 105 has a long-length form. The substrate-carrier system 141 comprises a feeding roll 144, a drum 145, a roll-up roll 146, and guide rolls 147. In the substrate-carrier system 141, a roll of the long-length base film 105 is loaded in the feeding roll 144, and the base film 105 is fed off from the feeding roll 144 when the feeding roll 144 rotates. The roll-up roll 146 rolls up the base film 105 after the vapor-barrier layer is formed on the base film 105.

The drum 145 is arranged so that the rotation axis of the drum 145 rotates in the direction perpendicular to the length direction of the base film 105 (i.e., the direction in which the base film 105 is moved). The drum 145 moves the base film 105 in the length direction while maintaining the base film 105 in a predetermined film-formation position, by rolling the base film 105 around the side surface of the drum 145. The guide rolls 147 (147*a* to 147*d*) guide the base film 105 along a predetermined carriage path. It is preferable that at least one of the guide rolls 147 is a tension-control roll which causes a predetermined tension in the base film 105.

The base film 105 is fed off from the feeding roll 144, guided by the guide rolls 147*a* and 147*b*, rolled around the drum 145, guided by the guide rolls 147*c* and 147*d*, and rolled up by the roll-up roll 146. Thus, the base film 105 is carried through the predetermined carriage path.

The film-formation system 151 comprises a cathode 153, a discharge power supply 154, a reactive-gas pipe 155, a reactive-gas-flow-rate control unit 156, a gas cylinder 157, a discharge-gas pipe 158, a discharge-gas-flow controller 159, a discharge-gas cylinder 161, and a control unit 162. The cathode 153 holds the target material 152 so as to face the lower end portion of the drum 145, and the discharge power supply 154 applies a discharge voltage to the cathode 153. It is preferable that the discharge power supply 154 is a DC-pulse power supply. In addition, the bulkhead 143 has an opening through which the target material 152 (the cathode 153) faces the lower end portion of the drum 145.

The reactive gas such as oxygen gas is supplied from the gas cylinder 157 to the film-formation system 151 in the vacuum chamber 140 through the reactive-gas pipe 155, where the flow rate of the reactive gas is controlled by the reactive-gas-flow-rate control unit 156. From the viewpoint of the responsiveness and the like, it is preferable that the reactive-gas-flow-rate control unit 156 is realized by using a piezo valve.

The discharge gas such as argon gas is supplied from the discharge-gas cylinder 161 to the film-formation system 151 in the vacuum chamber 140 through the discharge-gas pipe 158, where the flow rate of the reactive gas is controlled by the discharge-gas-flow controller 159. The discharge-gas-flow controller 159 can be realized by using a mass-flow controller or the like which is used in the conventional sputtering systems. In addition, the control unit 162 controls the discharge voltage applied by the discharge power supply 154 and the flow rate of the reactive gas through the reactive-gas-flow-rate control unit 156.

Next, an example of a process of producing a vapor-barrier layer by using the vacuum chamber 140 having the above construction is explained below.

The base film 105 is loaded in the feeding roll 144, and carried to the roll-up roll 146 through the guide rolls 147*a* and 147*b*, the drum 145, and the guide rolls 147*c* and 147*d*. After the vacuum chamber 140 is closed, the vacuum chamber 140 is evacuated by activating the vacuum pumps 160 until the pressure in the vacuum chamber 140 reaches a predetermined value.

After the pressure in the vacuum chamber 140 reaches the above predetermined value, the base film 105 is moved at a predetermined speed, and the discharge gas is introduced into the vacuum chamber 140 while controlling the flow rate of the discharge gas by using the discharge-gas-flow controller 159. The speed at which the base film 105 is moved during the film formation is not specifically limited, and is appropriately determined according to the film-formation rate requested for the base film 105, the output of the cathode 153, and the like. Thereafter, presputtering is performed by stabilizing the pressure in the vacuum chamber 140 at a predetermined value, and supplying electric power from the discharge power supply 154 to the cathode 153. After the presputtering is performed, the flow rate of the reactive gas is controlled by the reactive-gas-flow-rate control unit 156, the reactive gas is introduced into the vacuum chamber 140 through the reactive-gas pipe 155, and a predetermined voltage is applied to the cathode 153.

After the discharge voltage in the vacuum chamber 140 is maintained at a predetermined value as explained above, the flow rates of the discharge gas and the reactive gas supplied to the vacuum chamber 140 are reduced until the pressure in the vacuum chamber 140 reaches the desired film-formation pressure, and the vapor-barrier layer is formed on the base film 105. During the formation of the vapor-barrier layer, the discharge voltage is measured, and the measurement result is fed back to the control unit 162. The control unit 162 controls the reactive-gas-flow-rate control unit 156 based on the measured discharge voltage so that the discharge voltage is maintained constant during the formation of the vapor-barrier layer. After the vapor-barrier layer is formed on the base film 105, the base film 105 is guided by the guide rolls 147*c* and 147*d* to the roll-up roll 146, and rolled up by the roll-up roll 146.

As explained above, in the radiation-image conversion panels according to the second embodiment, a laminated film is produced by attaching a removable film (having a thickness of 10 to 500 micrometers) to a thin transparent film, and a vapor-barrier layer is formed on an exposed surface of the thin transparent film which constitutes the laminated film by vacuum deposition. Therefore, a protective layer can be produced without production of wrinkles in the thin transparent film, and the radiation-image conversion panel constituted by the wrinkle-free protective layer can produce images having superior quality. In addition, even when the stimulable-phosphor layer is formed of columnar crystals and a gap structure, a uniform protective layer can be produced, since the protective layer according to the second embodiment of the present invention is produced separately from the other parts of the radiation-image conversion panel by using the removable film.

Hereinbelow, the layers of the radiation-image conversion panels according to the second embodiment corresponding to the second aspect of the present invention other than the thin transparent film and the vapor-barrier layer are explained in detail.

Examples of the stimulable phosphor for use in the stimulable-phosphor layer in the radiation-image conversion panel according to the second embodiment are as follows.

(i) SrS:Ce, Sm, SrS:Eu, Sm, $ThO_2$:Er, and $La_2O_2S$:Eu, Sm, which are disclosed in U.S. Pat. No. 3,859,527.

(ii) ZnS:Cu, Pb, $BaO \cdot xAl_2O_3$:Eu (where $0.8 \leq x \leq 10$), and, $M^{II}OxSiO_2$:A (where $M^{II}$ is Mg, Ca, Sr, Zn, Cd, or Ba, A is Ce, Tb, Eu, Tm, Pb, Tl, Bi or Mn, and x satisfies $0.5 \leq x \leq 2.5$), which are disclosed in Japanese Unexamined Patent Publication No. 55-12142.

(iii) $(Ba_{1-x-y}, Mg_x, Ca_y)FX:aEu^{2+}$ (where X represents at least one of Cl and Br, x and y satisfy $0<x+y \leq 0.6$ and $xy \neq 0$, and a satisfies $10^{-6} \leq a \leq 5 \times 10^{-2}$), which are disclosed in Japanese Unexamined Patent Publication No. 55-12143.

(iv) LnOX:xA (where Ln represents at least one of La, Y, Gd, and Lu, X represents at least one of Cl and Br, A represents at least one of Ce and Tb, and x satisfies $0<x<0.1$), which are disclosed in Japanese Unexamined Patent Publication No. 55-12144.

(v) $(Ba_{1-x}, M^{2+}_x)FX:yA$ (where $M^{2+}$ represents at least one of Mg, Ca, Sr, Zn, and Cd, X represents at least one of Cl, Br, and I, A represents at least one of Eu, Tb, Ce, Tm, Dy, Pr, Ho, Nd, Yb, and Er, x satisfies $0 \leq x \leq 0.6$, and y satisfies $0 \leq y \leq 0.2$), which are disclosed in Japanese Unexamined Patent Publication No. 55-12145.

(vi) The phosphors expressed by the formula $M^{II}FX \cdot xA$:yLn (where $M^{II}$ represents at least one of Ba, Ca, Sr, Mg, Zn, and Cd, A represents at least one of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$, Ln represents at least one of Eu, Tb, Ce, Tm, Dy, Pr, Ho, Nd, Yb, Er, Sm, and Gd, X represents at least one of Cl, Br, and I, x and y satisfy $5 \times 10^{-5} \leq x \leq 0.5$, and $0<y \leq 0.2$), which are disclosed in Japanese Unexamined Patent Publication No. 55-160078.

(vii) The phosphors expressed by the formula $(Ba_{1-x}, M^{II}_x)F_2 \cdot aBaX_2:yEu$, zA (where $M^{II}$ represents at least one of beryllium, magnesium, calcium, strontium, zinc and cadmium, X represents at least one of chlorine, bromine, and iodine, A represents at least one of zirconium and scandium, and a, x, y, and z satisfy $0.5 \leq a \leq 1.25$, $0 \leq x \leq 1$, $10^{-6} \leq y \leq 2 \times 10^{-1}$, and $0<z \leq 10^{-2}$), which are disclosed in Japanese Unexamined Patent Publication No. 56-116777.

(viii) The phosphor expressed by the formula $(Ba_{1-x}, M^{II}_x)F_2 \cdot aBaX_2:yEu$, zB (where $M^{II}$ represents at least one of beryllium, magnesium, calcium, strontium, zinc and cadmium, X represents at least one of chlorine, bromine, and iodine, and a, x, y, and z satisfy $0.5 \leq a \leq 1.25$, $0 \leq x \leq 1$, $10^{-6} \leq y \leq 2 \times 10^{-1}$, and $0<z \leq 10^{-2}$), which are disclosed in Japanese Unexamined Patent Publication No. 57-23673.

(ix) The phosphors expressed by the formula $(Ba_{1-x}, M^{II}_x)F_2 \cdot aBaX_2:yEu$, zA (where $M^{II}$ is at least one of beryllium, magnesium, calcium, strontium, zinc and cadmium, X is at least one of chlorine, bromine, and iodine, A is at least one of arsenic and silicon, and a, x, y, and z satisfy $0.5 \leq a \leq 1.25$, $0 \leq x \leq 1$, $10^{-6} \leq y \leq 2 \times 10^{-1}$, and $0<z \leq 5 \times 10^{-1}$), which are disclosed in Japanese Unexamined Patent Publication No. 57-23675.

(x) The phosphors expressed by the formula $M^{III}OX:xCe$ (where $M^{III}$ is at least one trivalent metal selected from a group of Pr, Nd, Pm, Sm, Eu, Tb, Dy, Ho, Er, Tm, Yb, and Bi, X is at least one of Cl and Br, and x satisfies $0<x<0.1$), which are disclosed in Japanese Unexamined Patent Publication No. 58-69281.

(xi) The phosphors expressed by the formula $Ba_{1-x}M_{x/2}L_{x/2}FX:yEu^{2+}$ (where M is at least one alkali metal selected from a group of Li, Na, K, Rb, and Cs; L is at least one trivalent metal selected from a group of Sc, Y, La, Ce, Pr, Nd, Pm, Sm, Gd, Tb, Dy, Ho, Er, Tm, Yb, Lu, Al, Ga, In, and Tl; X represents at least one halogen element selected from a group of Cl, Br, and I; x satisfies $10^{-2} \leq x \leq 0.5$; and y satisfies $0<y \leq 0.1$), which are disclosed in Japanese Unexamined Patent Publication No. 58-206678.

(xii) The phosphors expressed by the formula $BaFX \cdot xA:yEu^{2+}$ (where X at least one halogen element selected from a group of Cl, Br, and I; A is a calcined tetrafluoroborate; x satisfies $10^{-6} \leq x \leq 0.1$; and y satisfies $0<y \leq 0.1$), which are disclosed in Japanese Unexamined Patent Publication No. 59-27980.

(xiii) The phosphors expressed by the formula $BaFX \cdot xA:yEu^{2+}$ (where X represents at least one halogen element selected from a group of, Cl, Br, and I; A represents a calcine of at least one hexafluoro compound selected from a group of a monovalent or divalent metal hexafluorosilicate, a monovalent or divalent metal hexafluorotitanate, and a monovalent or divalent metal hexafluorozirconate; x satisfies $10^{-6} \leq x \leq 0.1$; and y satisfies $0<y \leq 0.1$), which are disclosed in Japanese Unexamined Patent Publication No. 59-47289.

(xiv) The phosphors expressed by the formula $BaFX \cdot xNaX':aEu^{2+}$ (where X and X' each represent at least one of Cl, Br, and I, and x and a satisfy $0<x \leq 2$, and $0<a \leq 0.2$), which are disclosed in Japanese Unexamined Patent Publication No. 59-56479.

(xv) The phosphors expressed by the formula $M_{II}FX \cdot xNaX':yEu^{2+}: zA$ (where $M^{II}$ represents at least one alkaline-earth metal selected from a group of Ba, Sr, and Ca; X and X' each represent at least one halogen element selected from a group of Cl, Br, and I; A represents at least one transition metal selected from a group of V, Cr, Mn, Fe, Co, and Ni; x satisfies $0<x \leq 2$; y satisfies $0<y \leq 0.2$; and z satisfies $0<z \leq 10^{-2}$), which are disclosed in Japanese Unexamined Patent Publication No. 59-56480.

(xvi) The phosphors expressed by the formula $M^{II}FX \cdot aM^{I}X' \cdot bM^{II}X''_2 \cdot CM^{III}X_3 \cdot xA:yEu^{2+}$ (where $M^{II}$ represents at least one alkaline-earth metal selected from a group of Ba, Sr, and Ca; $M^{I}$ represents at least one alkali metal selected from a group of Li, Na, K, Rb, and Cs; M'II represents at least one divalent metal selected from a group of Be and Mg; $M^{III}$ represents at least one trivalent metal selected from a group of Al, Ga, In, and Tl; A represents a metal oxide; X represents at least one halogen element selected from a group of Cl, Br, and I; X', X'', and X each represent at least one halogen element selected from a group of F, Cl, Br, and I; a, b, and c satisfy $0 \leq a \leq 2$, $0 \leq b \leq 10^{-2}$, $0 \leq c \leq 10^{-2}$, and $a+b+c \geq 10^{-6}$; x satisfies $0<x \leq 0.5$: and y satisties $0<y \leq 0.2$), which are disclosed in Japanese Unexamined Patent Publication No. 59-75200.

(xvii) The phosphors expressed by the formula $X_2 \cdot aM^{II}X'_2:xEu^{2+}$ (where $M^{II}$ represents at least one alkaline-earth metal selected from a group of Ba, Sr, and Ca; X and X' each represent at least one halogen element selected from a group of Cl, Br, and I; $X \neq X'$; a satisfies $0.1 \leq a \leq 10.0$, x satisfies $0<x \leq 0.2$), which are disclosed in Japanese Unexamined Patent Publication No. 60-84381.

(xviii) The phosphors expressed by the formula $M^{II}FX \cdot aM^{I}X':xEu^{2+}$ (where $M^{II}$ represents at least one alkaline-earth metal selected from a group of Ba, Sr, and Ca; $M^{I}$ represents at least one alkali metal selected from a group of Rb and Cs; X represents at least one halogen element selected from a group of Cl, Br, and I; X' represents at least one halogen element selected from a group of F, Cl, Br, and I; and a and x satisfy $0 \leq a \leq 4.0$ and $0<x \leq 0.2$), which are disclosed in Japanese Unexamined Patent Publication No. 60-101173.

(xix) The phosphors expressed by the formula $M^{I}X:xBi$ (where $M^{I}$ represents at least one alkali metal selected from a group of Rb and Cs; X represents at least one halogen element selected from a group of Cl, Br, and I; and x satisfies $0<x \leq 0.2$), which are disclosed in Japanese Unexamined Patent Publication No. 62-25189.

(xx) The cerium-activated rare-earth oxyhalide phosphors expressed by the formula LnOX:xCe (where Ln represents at least one of La, Y, Gd, and Lu, X represents at least one of Cl, Br, and I, x satisfies $0<x\leq0.2$, the mole ratio of Ln to X is $0.500<X/Ln\leq0.998$, and the local maximum wavelength $\lambda$ in the stimulated luminescence spectrum satisfies 550 nm $<\lambda<700$ nm), which are disclosed in Japanese Unexamined Patent Publication No. 2-229882.

Further, the stimulable phosphors $M^{II}X_2 \cdot aM^{II}X'_2$:$xEu^{2+}$ disclosed in Japanese Unexamined Patent Publication No. 60-84381 may contain the following additives in the amounts indicated below per mole of $M^{II}X_2 \cdot aM^{II}X'_2$.

(a1) $bM^IX"$ (where $M^I$ represents at least one alkali metal selected from a group of Rb and Cs, X" represents at least one halogen element selected from a group of F, Cl, Br, and I, and b satisfies $0<b\leq10.0$), which are disclosed in Japanese Unexamined Patent Publication No. 60-166379.

(a2) $bKX" \cdot cMgX_2 \cdot dM^{III}X'_3$ (where $M^{III}$ represents at least one trivalent metal selected from a group of Sc, Y, La, Gd, and Lu, X", X and X' each represent at least one halogen element selected from a group of F, Cl, Br, and I, and b, c and d satisfy $0\leq b\leq2.0$, $0\leq c\leq2.0$, $0\leq d\leq2.0$, and $2\times10^{-5}\leq b+c+d$), which are disclosed in Japanese Unexamined Patent Publication No. 60-221483.

(a3) yB (where y satisfies $2\times10^{-4}\leq y\leq2\times10^{-1}$), which are disclosed in Japanese Unexamined Patent Publication No. 60-228592.

(a4) bA (where A represents at least one oxide selected from a group of $SiO_2$ and $P_2O_5$, and b satisfies $10^{-4}\leq b\leq2\times10^{-1}$), which are disclosed in Japanese Unexamined Patent Publication No. 60-228593.

(a5) bSiO (where b satisfies $0<b\leq3\times10^{-2}$), which are disclosed in Japanese Unexamined Patent Publication No. 61-120883.

(a6) $bSnX"_2$ (where X" represents at least one halogen element selected from a group of F, Cl, Br, and I, and b satisfies $0<b\leq10^{-3}$), which are disclosed in Japanese Unexamined Patent Publication No. 61-120885.

(a7) $bCsX" \cdot cSnX_2$ (where X" and X represents at least one halogen element selected from a group of F, Cl, Br, and I, and b and c satisfy $0<b\leq10.0$ and $10^{-6}\leq c\leq2\times10^{-2}$), which are disclosed in Japanese Unexamined Patent Publication No. 61-235486.

(a8) $bCsX" \cdot yLn^{3+}$ (where X" represents at least one halogen element selected from a group of F, Cl, Br, and I, Ln represents at least one rare-earth element selected from a group of Sc, Y, Ce, Pr, Nd, Sm, Gd, Tb, Dy, Ho, Er, Tm, Yb, and Lu, and b and y satisfy $0<b\leq10.0$ and $10^{-6}\leq y\leq1.8\times10^{-1}$), which are disclosed in Japanese Unexamined Patent Publication No. 61-235487.

Among the above phosphors, the divalent europium-activated alkaline-earth metal fluorohalide-based phosphors (for example, BaFI:Eu), the europium-activated alkali-metal halide-based phosphors (for example, CsBr:Eu), the divalent europium-activated alkaline-earth metal halide-based phosphor containing iodine, the rare-earth element-activated rare-earth element oxyhalide-based phosphor containing iodine, and the bismuth-activated alkali-metal halide-based phosphor containing iodine emit stimulated luminescence with particularly high intensities, and realize high-quality images, and therefore these materials are preferable for use in the stimulable-phosphor layer. In addition, the above phosphors can form needle crystals, the higroscopicity of these phosphors are often unignorable. Therefore, the protective layer according to the present invention can effectively prevent moisture absorption of the stimulable-phosphor layer.

The stimulable-phosphor layer may be formed by any of the known techniques such as evaporation, sputtering, or application.

In the case of evaporation, first, a substrate is set in an evaporation system, and the evaporation system is evacuated to a vacuum of about $1\times10^{-4}$ Pa. Then, at least one of the aforementioned phosphors is heated and evaporated so that the phosphor is deposited to a desired thickness on a surface of the substrate. The stimulable-phosphor layer may be formed in a plurality of evaporation processes. Further, in the evaporation process, it is possible to perform co-evaporation by using a plurality of resistance heaters or electron beams so that a desired stimulable phosphor is synthesized on the substrate and the stimulable-phosphor layer is formed. Furthermore, it is possible to perform a heat treatment of the stimulable-phosphor layer after the evaporation is completed.

In the case of the sputtering, a substrate is set in a sputtering system, and the sputtering system is evacuated to a vacuum of about $1\times10^{-4}$ Pa. Then, inert gas such as Ar gas or Ne gas as sputtering gas is introduced into the sputtering system so that the gas pressure becomes about $10^{-1}$ Pa. Thereafter, the stimulable phosphor is set as a target, and sputtering is performed so that the phosphor is deposited to a desired thickness on a surface of the substrate. The stimulable-phosphor layer may be formed in a plurality of sputtering processes. It is also possible to form the stimulable-phosphor layer by using a plurality of targets realized by different stimulable phosphors, and concurrently or sequentially sputter the plurality of targets. Further, it is possible to perform reactive sputtering by introducing other gas such as $O_2$, $H_2$, or halogen gas as necessary. Furthermore, it is possible to perform a heat treatment of the stimulable-phosphor layer after the sputtering is completed.

In the case of the application, a solution to be applied is prepared by sufficiently mixing the phosphor with a solvent so that the phosphor is uniformly distributed in the solution. Then, the solution is uniformly applied to a surface of the substrate so as to form a coated film. The operation of the application can be performed, for example, by using the doctor blade, the roll coater, the knife coater, and the like.

Although the thickness of the stimulable-phosphor layer is changed depending on the characteristics of the desired radiation-image conversion panel, the type of the stimulable phosphor, the mixing ratio of a binder and the stimulable phosphor, and the like, the thickness of the stimulable-phosphor layer is normally about 20 micrometers to 1 millimeter, and preferably 50 to 500 micrometers.

The radiation-image conversion panel according to the second embodiment may further comprise a conventionally known gas-barrier layer. When such a gas-barrier layer is made of an organic material, the organic material may be an organic polymeric material including acrylonitrile-based polymers, vinyl alcohol-based polymers, and the like. For example, the acrylonitrile-based polymers include polyacrylonitrile, acrylonitrile-methyl acrylate copolymer, acrylonitrile-styrene copolymer, and the like, and the vinyl alcohol-based polymers include polyvinylidene chloride, polyvinyl alcohol, polyvinyl alcohol-ethylene copolymer, and the like.

When the above gas-barrier layer is made of an inorganic material, the inorganic material may be at least one of the following materials (i) and (ii):

(i) Silicon dioxide or at least one compound containing silicon dioxide as a main component and at least one metal oxide such as silicon mono-oxide or aluminum oxide, e.g., $SiO_x$.

(ii) Silicon nitride or at least one compound containing silicon nitride as a main component and at least one metal nitride such as aluminum nitride, e.g., SiAlN.

Among the above inorganic materials, $SiO_x$ is particularly preferable, where x is preferably 1.3 to 1.8, and more preferably 1.5.

The radiation-image conversion panel according to the second embodiment may comprise one or more gas barrier layers, which can be formed in a similar manner to the aforementioned vapor-barrier layers. Further, the aforementioned inorganic layers constituting the vapor-barrier layers can be used as the gas barrier layers.

The adhesive used in the adhesive layer for bonding the vapor-barrier layer and the stimulable-phosphor layer and the adhesive used for bonding the sealing frame and the protective layer are not specifically limited. However, it is preferable that the above adhesives are each a resin which is cured at a temperature lower than 100° C., and the water-vapor transmission rate of the resin is 50 g·mm/(m²·day) or lower. Specifically, it is possible to use various types of adhesives including polyester-based adhesives, polyurethane-based adhesives, polyacetate-based adhesives, polyacryl-based adhesives, soft acryl-based adhesives, polyvinyl-based adhesives, polyamide-based adhesives, epoxy-based adhesives, rubber-based adhesives, and urethane-based adhesives.

It is preferable to perform in a dry atmosphere each of the operation of adhering the protective layer to the stimulable-phosphor layer through the adhesive layer in the radiation-image conversion panel illustrated in FIGS. 3A to 3E and the operation of adhering the protective layer to the sealing frame for sealing the stimulable-phosphor layer in the radiation-image conversion panel illustrated in FIGS. 5A to 5E. In addition, the operation for sealing the stimulable-phosphor layer is preferably performed at a reduced pressure. When the radiation-image conversion panels are assembled as above, undesirable separation of the protective layers, which is likely to occur when the atmospheric pressure is low, becomes less likely to occur.

The substrate in the radiation-image conversion panels according to the second embodiment can be made of an arbitrary one of the materials which are used as substrates in the conventional radiation-image conversion panels.

In addition, for some of the conventional radiation-image conversion panels, in order to strengthen the binding between the substrate and the stimulable-phosphor layer or improve the sensitivity and image quality (sharpness and graininess) of the radiation-image conversion panels, the following provisions are known.

(i) A layer for making a surface of a substrate adhesive is provided for arrangement of a stimulable-phosphor layer on the surface, for example, by applying a polymeric material such as gelatin to the surface.

(ii) A light reflection layer made of a light reflective material such as titanium dioxide is provided in a radiation-image conversion panel.

(iii) A light absorption layer made of a light absorptive material such as carbon black is provided in a radiation-image conversion panel.

The above provisions can also be implemented in the radiation-image conversion panels according to the present invention. It is possible to choose one or more of the provisions according to the purpose and use of each radiation-image conversion panel.

Further, as disclosed in Japanese Unexamined Patent Publication No. 58-200200, in order to improve the sharpness of images obtained by use of the radiation-image conversion panels, it is possible to form very small projections and depressions on the surface of the substrate on which the stimulable-phosphor layer is to be arranged. In the case where at least one of the above layers by the provisions (i) to (iii) is arranged on the stimulable-phosphor side of the substrate, the very small projections and depressions are formed on a surface of one of the above layers on which the stimulable-phosphor layer is to be arranged.

Hereinbelow, examples of the radiation-image conversion panel according to the second embodiment of the present invention are explained in comparison with some comparison examples.

[Examples of the Second Embodiment of the Present Invention]

Example 5

After a soda glass plate having a thickness of 8 mm is set as a substrate in an evaporation system so that a surface (which is desired to be processed) of the substrate is evaporated, a $EuBr_2$ tablet and a CsBr tablet are placed at predetermined positions and the evaporation system is evacuated to a vacuum of $1\times10^{-3}$ Pa. Subsequently, the substrate is heated to 200° C. by using a heater. Thereafter, the $EuBr_2$ tablet and the CsBr tablet (which are placed in platinum boats) are irradiated with electron beams which are emitted from electron guns with acceleration voltages of 4.0 kV, so that a stimulable-phosphor layer (CsBr:0.01Eu) is deposited on the substrate at the rate of 4 μm /min to the thickness of 500 micrometers. Thereafter, the atmospheric pressure is restored in the evaporation system, and the substrate is taken out of the evaporation system.

A laminated film is produced by attaching a removable film to a thin transparent film having a thickness of 6 micrometers by using a nip roller or the like, where the removable film is heat resistant, has a thickness of 50 micrometers, and can be removed from the thin transparent film at a later stage. Next, an $SiO_x$ vapor-barrier layer having a thickness of 100 nm is formed on the exposed surface of the thin transparent film in the laminated film by sputtering. Thus, a moisture-resistant film is obtained. Subsequently, an adhesive layer is formed on the $SiO_x$ vapor-barrier layer by application, where the adhesive layer is made of a polyester resin (VYLON 300, available from Toyobo Co., Ltd, Japan) and has an coating weight of 2 g/m². Next, the above moisture-resistance film is positioned above the stimulable-phosphor layer so that the adhesive layer faces the stimulable-phosphor layer, and the moisture-resistance film is laminated to the stimulable-phosphor layer. Thereafter, a radiation-image conversion panel is obtained by removing the removable film from the moisture-resistance film.

Example 6

The radiation-image conversion panel as the example 6 is different from the radiation-image conversion panel as the example 5 only in that the thin transparent film has a thickness of 9 micrometers, and the removable film has a thickness of 38 micrometers.

Example 7

The radiation-image conversion panel as the example 7 is different from the radiation-image conversion panel as the example 5 only in that the thin transparent film has a thickness of 12 micrometers, and the removable film has a thickness of 38 micrometers.

Example 8

A laminated film is produced by attaching a first removable film to a thin transparent film having a thickness of 9 micrometers by using a nip roller or the like, where the first removable film is heat resistant, has a thickness of 38 micrometers, and can be removed from the thin transparent film at a later stage. Subsequently, a first antireflection (AR) layer is formed on the exposed surface of the thin transparent film in the laminated film by forming an ITO layer having a thickness of 25 nm, an $SiO_2$ layer having a thickness of 25 nm, and an ITO layer having a thickness of 85 nm in this order by sputtering. Thereafter, the first removable film is removed, and a second removable film having the same thickness as the first removable film is attached to the first AR layer. Subsequently, a first vapor-barrier layer being made of $SiO_x$ and having a thickness of 100 nm is formed on the exposed surface of the thin transparent film in the laminated film, and a gas-barrier layer being made of PVA and $SiO_x$ and having a thickness of 600 nm is formed on the first vapor-barrier layer. Thereafter, a second vapor-barrier layer being made of $SiO_x$ and having a thickness of 100 nm is formed on the gas-barrier layer, and a second antireflection (AR) layer is formed on the second vapor-barrier layer by forming an ITO layer having a thickness of 25 nm, an $SiO_2$ layer having a thickness of 25 nm, and an ITO layer having a thickness of 85 nm in this order. Thus, a protective layer is obtained.

Next, the second AR layer side of the above protective layer is adhered to a sealing frame with a two-liquid type epoxy resin (XB 5047, XB 5067, available from Vantico Inc.), where the sealing frame has vertical and horizontal dimensions of 450×450 mm, a thickness of 0.5 mm, a width of 6 mm, and internal corners rounded with a diameter of 2 mm, and the two-liquid type epoxy resin has a water-vapor transmission rate of 0.5 g·mm/ (m²·day). At this time, the centers of the protective layer and the sealing frame are aligned, and the upper end of the sealing frame is adhered to the protective layer. Thereafter, the two-liquid type epoxy resin is cured at 40° C. for a day. Thus, the protective layer and the sealing frame are bonded together.

In addition, a soda glass plate having a surface area of 450×450 mm and a thickness of 8 mm is prepared as a substrate. A reflection layer made of aluminum is formed on a surface (except the near-edge areas having a width of 8 mm) of the soda glass plate by evaporation, and evacuation holes are formed near the four corners of the soda glass plate, where each of the evacuation holes is located at a distance of 11 mm from each of the two nearest sides of the soda glass plate. Then, the near-edge areas and the evacuation holes are covered with a mask, and the soda glass plate is placed in an evaporation system in order to deposit a stimulable phosphor on the exposed area of the surface of the soda glass plate. Next, a $EuBr_m$ tablet and a CsBr tablet are placed at predetermined positions and the evaporation system is evacuated to a vacuum of 1.0 Pa. Subsequently, the substrate is heated to 100° C. by using a heater. Thereafter, the $EuBr_m$ tablet and the CsBr tablet (which are placed in platinum boats) are heated, so that a stimulable-phosphor layer (CsBr:Eu) is deposited to the thickness of 500 micrometers on the exposed area of the surface of the substrate. Thereafter, the atmospheric pressure is restored in the evaporation system, and the substrate is taken out of the evaporation system.

The applicants have observed that the stimulable phosphor are formed on the substrate in a great number of needle-shaped columns standing in the vertical direction and each having a thickness of about 8 micrometers, and there are small gaps between the needle-shaped columns.

Thus, the following parts of the radiation-image conversion panel are obtained through the above operations:

(i) The soda-glass support on which the Al reflection layer and the CsBr:Eu stimulable phosphor layer are formed as described above; and (ii) The protective layer to which the sealing frame is adhered.

Then, the above parts are bonded together by using an adhesive (SU 2153-9, available from SANYU REC Co., Ltd, Japan) and applying pressure to the parts, and the adhesive is cured at room temperature (25° C.) for 12 hours. The above adhesive (SU 2153-9) has a water-vapor transmission rate of 20 g·mm/ (m²·day), which is measured in a manner similar to the aforementioned measurement of the water-vapor transmission rates. Further, the evacuation holes are closed by filling the evacuation holes with EPDM (ethylene-propylene dien monomer) rubber, and the EPDM rubber is bonded with the adhesive (SU 2153-9).

As explained above, a structure in which the stimulable-phosphor layer is sealed by the support, the sealing frame, and the protective layer is obtained. Thereafter, an injection needle is passed through the EPDM rubber with which each of the evacuation holes is filled, and the above structure is evacuated with a vacuum pump so that the internal pressure of the above structure is reduced. Then, the EPDM rubber with which each of the evacuation holes is filled is sealed with a glass plug to which an adhesive (SU 2153-9) is applied. Finally, the removable film is removed from the laminated film. Thus, a radiation-image conversion panel is obtained.

Example 9

A laminated film is produced by attaching a removable film to a thin transparent film having a thickness of 6 micrometers by using a nip roller or the like, where the removable film is heat resistant, has a thickness of 50 micrometers, and can be removed from the thin transparent film at a later stage. Next, a first $SiO_2$ layer having a thickness of 100 micrometers is formed on the exposed surface of the thin transparent film in the laminated film by sputtering using the sputtering system illustrated in FIG. 7.

In order to form the above first $SiO_2$ layer, the sputtering system illustrated in FIG. 7 is used. Specifically, after the sputtering system is evacuated until the internal pressure reaches $4 \times 10^{-4}$ Pa, Ar gas is introduced into the sputtering system, and presputtering is performed at the film-formation pressure of 0.27 Pa with the discharge power of 7 kW. Thereafter, the first $SiO_2$ layer having a thickness of 100 nm is formed on the exposed surface of the thin transparent film in the laminated film by introducing $O_2$ gas into the sputtering system, controlling the discharge voltage to be maintained at 610 V, and then reducing the flow rate of Ar gas and $O_2$ gas so as to lower the film-formation pressure to 0.03 Pa.

Subsequently, a composite-compound layer (of organic and inorganic materials) containing PVA and $SiO_2$ in the ratio of 1:4 (containing 20% or more of an organic material) and having a thickness of 0.6 micrometers is formed on the above first $SiO_2$ layer by application, and then a second $SiO_2$ layer having a thickness of 100 nm is formed on the composite-compound layer by using the sputtering system under the same conditions as the first $SiO_2$ layer. Thus, a protective layer is obtained.

Thereafter, an adhesive layer having a thickness of 1 micrometer is formed on the second $SiO_2$ layer by application, where the adhesive layer is made of a polyester resin (VYLON 300, available from Toyobo Co., Ltd, Japan) and has an coating weight of 2 g/m². Then, the protective layer is laminated to a stimulable-phosphor layer (CsBr:0.01Eu) by bonding the adhesive layer to the upper surface of the stimulable-phosphor layer, where the stimulable-phosphor layer is separately prepared as in the example 5. Finally, a radiation-image conversion panel is obtained by removing the removable film from the moisture-resistance film.

Comparison Example 3

The radiation-image conversion panel as the comparison example 3 is produced as follows.
A moisture-resistant film is produced by directly forming an $SiO_x$ vapor-barrier layer having a thickness of 100 nm on a surface of a thin transparent having a thickness of 6 micrometers by sputtering, and forming an adhesive layer on the $SiO_x$ vapor-barrier layer by application, where the adhesive layer is made of a polyester resin (VYLON 300, available from Toyobo Co., Ltd, Japan) and has an coating weight of 2 g/m². Then, a radiation-image conversion panel is obtained by laminating the above moisture-resistant film to the stimulable-phosphor layer which is produced as in the example 5.

Comparison Example 4

The radiation-image conversion panel as the comparison example 4 is produced as follows.
A moisture-resistant film is produced by directly forming an $SiO_x$ vapor-barrier layer having a thickness of 100 nm on a surface of a thin transparent having a thickness of 50 micrometers by sputtering, and forming an adhesive layer on the $SiO_x$ vapor-barrier layer by application, where the adhesive layer is made of a polyester resin (VYLON 300) and has an coating weight of 2 g/m². Then, a radiation-image conversion panel is obtained by laminating the above moisture-resistant film to the stimulable-phosphor layer which is produced as in the example 5.

Comparison Example 5

The radiation-image conversion panel as the comparison example 5 is produced as follows.
A laminated film is produced by laminating a removable film having a thickness of 50 micrometers to a thin transparent having a thickness of 6 micrometers by sputtering, and forming an adhesive layer on the thin transparent film by application, without arranging the $SiO_x$ vapor-barrier layer, where the adhesive layer is made of a polyester resin (VYLON 300) and has an coating weight of 2 g/m². Then, a radiation-image conversion panel is obtained by laminating the above laminated film to the stimulable-phosphor layer which is produced as in the example 5.

Comparison Example 6

The radiation-image conversion panel as the comparison example 6 is different from the radiation-image conversion panel as the example 8 only in that a laminated film is produced as follows.
The laminated film is produced by forming a first antireflection (AR) layer on a first surface of a thin transparent film by sputtering, forming an $SiO_x$ vapor-barrier layer having a thickness of 100 nm on a second surface of the thin transparent film, forming a gas-barrier layer being made of PVA and $SiO_x$ and having a thickness of 600 nm on the vapor-barrier layer, and forming a second antireflection (AR) layer on the gas-barrier layer, where each of the first and second antireflection (AR) layers is formed by forming an ITO layer having a thickness of 25 nm, an $SiO_2$ layer having a thickness of 25 nm, and an ITO layer having a thickness of 85 nm in this order by sputtering.

Comparison Example 7

The radiation-image conversion panel as the comparison example 7 is different from the radiation-image conversion panel as the example 8 only in that no protective layer is arranged.

[Evaluation]

The wrinkles and the water-vapor transmission rate of the protective layer, sharpness, image quality, and moisture resistance of the radiation-image conversion panel produced in each of the examples 5 to 9 are evaluated below. The result of the evaluation is summarized in Table 3.
The protective layers are visually checked for wrinkles. In the column "WRINKLE" in Table 3, a blank circle indicates that no wrinkle is observed, and a small cross indicates that a wrinkle is observed.
The water-vapor transmission rate of the protective layer is measured based on the amount of water vapor which passes through the protective layer per unit time (24 hours) per unit area (1 m²) in the environment at the temperature of 40° C. and the relative humidity (RH) of 90%.
The moisture resistance is measured based on the luminous energy of the stimulated luminescence measured before and after a 30-day period during which the radiation-image conversion panel is left in an environment at the temperature of 40° C. and the relative humidity (RH) of 90%. When the decrease in the luminous energy over the 30-day period is less than 5%, "A" is indicated in the column "MOISTURE RESISTANCE" in Table 3. When the decrease in the luminous energy over the 30-day period is 5% or between 5% and 10%, "B" is indicated in the column "MOISTURE RESISTANCE" in Table 3. When the decrease in the luminous energy over the 30-day period is 10% or more, "C" is indicated in the column "MOISTURE RESISTANCE" in Table 3.
The sharpness is evaluated as follows.
After the radiation-image conversion panel is irradiated with X rays at the tube voltage of 80 kVp, the radiation-image conversion panel is excited by scanning the radiation-image conversion panel with linearly arrayed laser diodes which concurrently apply excitation light to a linear area of the radiation-image conversion panel, where the excitation light has an emission wavelength of 650 nm, and stimulated luminescence emitted from the linear area of the radiation-image conversion panel is received by a CCD array in which a number of photoelectric conversion elements are arrayed in the length direction of the linear area. The CCD array converts the received stimulated luminescence to an electric signal, and an image reproducing device reproduces an image based on the electric signal, and displays the image on a display device. Then, the modulation transfer function (MTF) of the reproduced image is obtained at the spatial frequency of 2 cycles/mm by analyzing the above image by a computer. In Table 3, the MTF value of the radiation-image conversion panel in the comparison example 7 is set to 10, and the MTF values of the other comparison examples 3 to 6 and the examples 5 to 9 relative to the MTF value of the radiation-image conversion panel in the comparison example 7 are indicated in the column "RELATIVE MTF." The higher MTF values correspond to higher sharpness levels.

All of the contents of the Japanese patent application No. 2003-390578 are incorporated into this specification by reference.

TABLE 3

|  | Thin Transparent Film Thickness (μm) | Removable Film Thickness (μm) | Vapor-Barrier Layer Thickness (nm) | Antireflection Film | Wrinkle | Water Vapor Transmission Rate g/(m² · day) | Relative MTF | Image Quality | Moisture Resistance | Overall Judgment |
|---|---|---|---|---|---|---|---|---|---|---|
| Ex. 5 | 6 | 50 | 100 | No | ○ | 0.8 | 95 | A | A | ◎ |
| Ex. 6 | 9 | 38 | 100 | No | ○ | 0.8 | 92 | A | A | ◎ |
| Ex. 7 | 12 | 38 | 100 | No | ○ | 0.8 | 87 | A | A | ○ |
| Ex. 8 | 9 | 38 | 100 | Yes | ○ | 0.8 | 95 | A | A | ◎ |
| Ex. 9 | 6 | 50 | 800 | No | ○ | 0.06 | 95 | A | A | ◎ |
| Comp. Ex. 3 | 6 | No | 100 | No | X | 0.8 | 95 | C | A | X |
| Comp. Ex. 4 | 50 | No | 100 | No | ○ | 0.8 | 70 | A | A | X |
| Comp. Ex. 5 | 6 | 50 | No | No | ○ | 60 | 95 | A | C | X |
| Comp. Ex. 6 | 9 | No | 100 | Yes | X | 0.8 | 92 | C | A | X |
| Comp. Ex. 7 | No | No | No | No | ○ | — | 100 | A | C | X |

As indicated in Table 3, the radiation-image conversion panels in the examples 5 to 9 have no wrinkles in their protective layers and satisfactory water-vapor transmission rates, and are superior in sharpness, image quality, and moisture resistance. Since the thin transparent film in the radiation-image conversion panel in the example 7 has a slightly greater thickness (16 micrometers) than the thin transparent films in the examples 5, 6, 8, and 9, the radiation-image conversion panel in the example 7 is slightly inferior to the examples 5, 6, 8, and 9.

The comparison example 3 is different from the example 5 in that the vapor-barrier layer is directly formed on the thin transparent film by vacuum deposition without using the removable film. In this case, wrinkles occur in the protective layer, and the image quality deteriorates.

The comparison example 4 is different from the comparison example 3 in that the thickness of the thin transparent film is increased. Since the thickness of the thin transparent film is increased, no wrinkles occur in the protective layer. However, the relative MTF value is extremely lowered by the increase in the thickness of the thin transparent film.

In the comparison example 5, the moisture resistance extremely deteriorates due to the absence of the vapor-barrier layer.

Although the radiation-image conversion panel in the comparison example 6 has a vapor-barrier layer and a gas-barrier layer as in the example 8, the removable film is not used. Therefore, wrinkles occur, and the image quality deteriorates.

In the example 9, the composite-compound layer (of organic and inorganic materials) is arranged between the two vapor-barrier layers. Therefore, it is possible to fill in defects in the inorganic layers, and enhance the moisture resistance of the radiation-image conversion panel. In addition, since the vapor-barrier layers are formed by impedance-controlled reactive sputtering, distortion or wrinkles, which can occur in the protective layer disclosed in U.S. Patent Laid-Open No. 20030146395, do not occur in the protective layer in the radiation-image conversion panel in the example 9. Thus, when the radiation-image conversion panel in the example 9 is used, high-quality images are obtained.

What is claimed is:

1. A radiation-image conversion panel comprising:
   a support;
   a fluorescent layer being formed on said support and containing a phosphor; and
   a protective layer being formed on said fluorescent layer and having a water-vapor transmission rate of 1 g/m²/24 h or lower at 40° C. and a reflectance of 3% or lower at a wavelength of light emitted from the phosphor.

2. A radiation-image conversion panel according to claim 1, wherein said protective layer covers an upper surface and side surfaces of said fluorescent layer.

3. A radiation-image conversion panel according to claim 1, wherein said protective layer comprises a transparent base and a single layer being formed on the transparent base and having a lower refractive index than the transparent base.

4. A radiation-image conversion panel according to claim 1, wherein said protective layer comprises a transparent base and at least one first sublayer and at least one second sublayer which are alternately formed on the transparent base, each of the at least one first sublayer have a high refractive index, each of the at least one second sublayer have a low refractive index, and at least one of the transparent base, the at least one first sublayer, and the at least one second sublayer has a low water-vapor transmission rate.

5. A radiation-image conversion panel according to claim 4, wherein each of said at least one first sublayer is made of an inorganic material having the high refractive index and each of said at least one second sublayer is made of an inorganic material having the low refractive index.

6. A radiation-image conversion panel according to claim 5, wherein said inorganic material having the high refractive index is one of titanium dioxide and a composite indium-tin oxide.

7. A radiation-image conversion panel according to claim 5, wherein said inorganic material having the low refractive index is at least one of silicon oxide and aluminum oxide.

8. A radiation-image conversion panel according to claim 7, wherein one or more of said at least one second sublayer has a density of 1.9 to 4.2 g/cm³.

9. A radiation-image conversion panel according to claim 8, wherein one or more of said at least one second sublayer is formed by sputtering at 0.01 to 1 Pa of vacuum.

10. A radiation-image conversion panel according to claim 8, wherein one or more of said at least one second sublayer is formed by plasma chemical vapor deposition.

11. A radiation-image conversion panel according to claim 1, wherein said protective layer has a thickness of 5 to 10 micrometers.

12. A radiation-image conversion panel according to claim 1, wherein said fluorescent layer is formed by vapor deposition.

13. A radiation-image conversion panel according to claim 12, wherein said phosphor is an alkali metal halide-based stimulable phosphor which has a composition expressed as

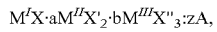

$M^I X \cdot aM^{II} X'_2 \cdot bM^{III} X''_3 : zA$, where $M^I$ is at least one alkali metal element selected from a group consisting of Li, Na, K, Rb, and Cs; $M^{II}$ is at least one alkaline-earth metal element or divalent metal element selected from a group consisting of Be, Mg, Ca, Si, Ba, Ni, Cu, Zn, and Cd; $M^{III}$ is at least one rare-earth element or trivalent metal element selected from a group consisting of Sc, Y, La, Ce, Pr, Nd, Pm, Sm, Eu, Gd, Tb, Dy, Ho, Er, Tm, Yb, Lu, Al, Ga, and In; each of X, X', and X" is at least one halogen element selected from a group consisting of F, Cl, Br, and I; A is at least one rare-earth element or metal element selected from a group consisting of Y, Ce, Pr, Nd, Sm, Eu, Gd, Tb, Dy, Ho, Er, Tm, Yb, Lu, Cu, Ag, Tl, and Bi; and a, b, and z are numerical values respectively satisfying $0 \leq a < 0.5$, $0 \leq b < 0.5$ and $0 < z < 1.0$.

14. A radiation-image conversion panel according to claim 13, wherein $M^I$ is Cs, X is Br, A is Eu, and z satisfies the condition $1 \times 10^{-4} \leq z \leq 0.1$.

15. A radiation-image conversion panel comprising:
a phosphor layer; and
a protective layer formed on said phosphor layer;
wherein said protective layer is obtained by attaching a removable film to a thin transparent film so as to produce a laminated film, forming a first vapor-barrier layer, a composite-compound layer, and a second vapor-barrier layer, in this order, on an exposed surface of the thin transparent film which constitutes the laminated film so as to produce a moisture-resistant film, placing said moisture-resistant film on said phosphor layer, and removing said removable film from said moisture-resistant film.

16. A radiation-image conversion panel according to claim 15, wherein said thin transparent film has a thickness of 10 micrometers or smaller.

17. A radiation-image conversion panel according to claim 15, wherein said thin transparent film has a water-vapor transmission rate of 1 $g/(m^2/day)$ or lower after said vapor-barrier layer is formed.

18. A process for producing a radiation-image conversion panel which includes a phosphor layer and a protection layer formed on said phosphor layer through an adhesive layer, comprising the steps of:
(a) attaching a removable film to a thin transparent film so as to produce a laminated film, where the removable film has a thickness of 10 to 500 micrometers;
(b) forming a first vapor-barrier layer, a composite-compound layer, and a second vapor-barrier layer, in this order, on an exposed surface of said thin transparent film constituting said laminated film by vacuum deposition so as to produce a moisture-resistant film; and
(c) removing said removable film from said moisture-resistant film so as to obtain said protection layer.

19. A radiation-image conversion panel comprising:
a phosphor layer; and
a protective layer formed on said phosphor layer;
wherein said protective layer has a first vapor-barrier layer, a composite-compound layer, and a second vapor-barrier layer, in this order, on an exposed surface of a thin transparent film.

20. A radiation-image conversion panel according to claim 19, wherein said thin transparent film has a thickness of 10 micrometers or smaller.

21. A radiation-image conversion panel according to claim 19, wherein said thin transparent film has a water-vapor transmission rate of 1 $g/(m^2/day)$ or lower after said vapor-barrier layer is formed.

* * * * *